(12) United States Patent
Abe et al.

(10) Patent No.: US 8,269,799 B2
(45) Date of Patent: Sep. 18, 2012

(54) IMAGE SIGNAL PROCESSOR AND IMAGE DISPLAY DEVICE

(75) Inventors: Takaaki Abe, Osaka (JP); Masutaka Inoue, Hirakata (JP); Susumu Tanase, Kadoma (JP); Yoshinao Hiranuma, Hirakata (JP); Seiji Tsuchiya, Otsu (JP); Masahiro Haraguchi, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 1101 days.

(21) Appl. No.: 11/923,724

(22) Filed: Oct. 25, 2007

(65) Prior Publication Data

US 2008/0136835 A1    Jun. 12, 2008

(30) Foreign Application Priority Data

Oct. 25, 2006   (JP) ................. 2006-289709
Jun. 1, 2007    (JP) ................. 2007-147255
Oct. 9, 2007    (JP) ................. 2007-263449

(51) Int. Cl.
*G09G 5/02* (2006.01)

(52) U.S. Cl. ....................................... 345/690
(58) Field of Classification Search ............ 345/690
See application file for complete search history.

(56) References Cited

U.S. PATENT DOCUMENTS

| | | | | |
|---|---|---|---|---|
| 2004/0252130 | A1* | 12/2004 | Lee et al. | 345/603 |
| 2004/0263528 | A1* | 12/2004 | Murdoch et al. | 345/600 |
| 2005/0078122 | A1* | 4/2005 | Ohga | 345/589 |
| 2005/0285828 | A1* | 12/2005 | Inoue et al. | 345/76 |

FOREIGN PATENT DOCUMENTS

| | | |
|---|---|---|
| JP | 07-075116 | 3/1995 |
| JP | 11-174583 | 7/1999 |
| JP | 2001-209047 | 8/2001 |
| JP | 2005-189472 | 7/2002 |
| JP | 2004-280108 | 10/2004 |
| JP | 2006-133711 | 5/2006 |

* cited by examiner

*Primary Examiner* — Quan-Zhen Wang
*Assistant Examiner* — Tony Davis
(74) *Attorney, Agent, or Firm* — Marvin A. Motsenbocker; Mots Law, PLLC

(57) ABSTRACT

An image signal processor includes a controller configured to generate a red output signal, a green output signal, a blue output signal and a fourth color output signal in accordance with image input signals. A fourth color light component enables to reproduce a color outside the range of a color reproducible by the red light component, the green light component and the blue light component. The controller generates the fourth color output signal on the basis of a reference signal corresponding to a color different from a complementary color of a color reproduced by the fourth color light component.

10 Claims, 20 Drawing Sheets

FIG. 15

| (m−1, n+1) | (m, n+1) | (m+1, n+1) |
|---|---|---|
| (m−1, n) | (m, n) | (m+1, n) |
| (m−1, n−1) | (m, n−1) | (m+1, n−1) |

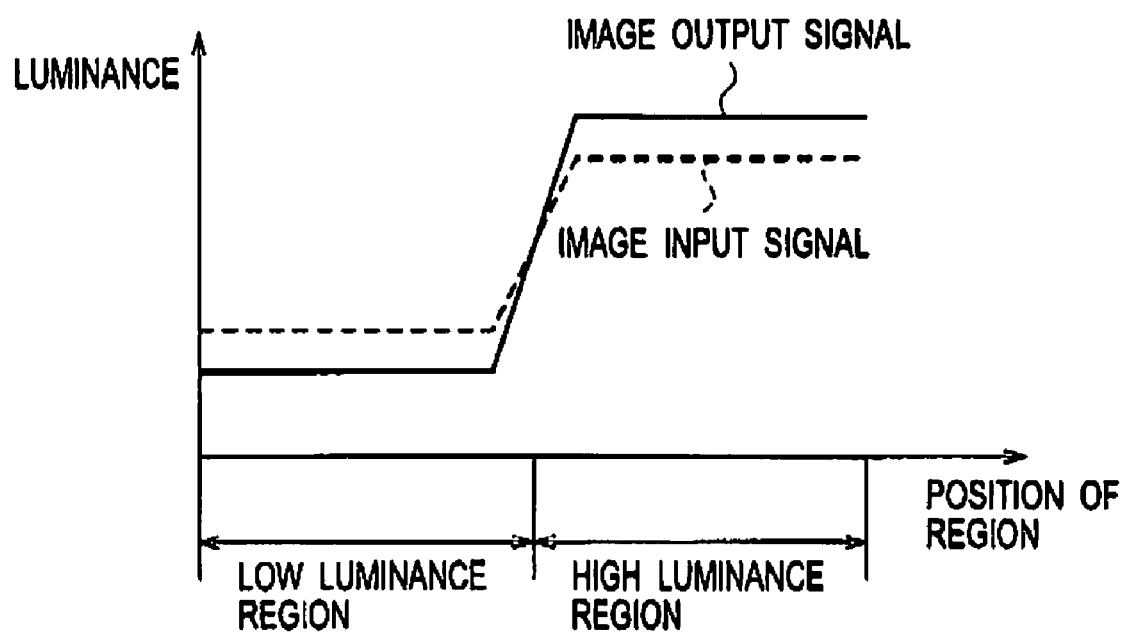

FIG. 21

| | POLARIZATION SWITCHING ELEMENT Ye | | OUTPUT LIGHT | | POLARIZER |
|---|---|---|---|---|---|
| | COLOR COMPONENT LIGHT | INCIDENT LIGHT | POWER OFF | POWER ON | |
| POLARIZATION SWITCHING ELEMENT Ye-1 | YELLOW COMPONENT LIGHT Ye | P POLARIZATION | P POLARIZATION | S POLARIZATION | POLARIZER G-1 (P POLARIZATION:TRANSMIT S POLARIZATION:BLOCK) |
| | GREEN COMPONENT LIGHT G | | P POLARIZATION | P POLARIZATION | |
| POLARIZATION SWITCHING ELEMENT Ye-2 | YELLOW COMPONENT LIGHT Ye | | S POLARIZATION | P POLARIZATION | |
| | GREEN COMPONENT LIGHT G | | P POLARIZATION | P POLARIZATION | |
| POLARIZATION SWITCHING ELEMENT Ye-1 | YELLOW COMPONENT LIGHT Ye | S POLARIZATION | S POLARIZATION | P POLARIZATION | POLARIZER G-2 (S POLARIZATION:TRANSMIT P POLARIZATION:BLOCK) |
| | GREEN COMPONENT LIGHT G | | S POLARIZATION | S POLARIZATION | |
| POLARIZATION SWITCHING ELEMENT Ye-2 | YELLOW COMPONENT LIGHT Ye | | P POLARIZATION | S POLARIZATION | |
| | GREEN COMPONENT LIGHT G | | S POLARIZATION | S POLARIZATION | |

IMAGE SIGNAL PROCESSOR AND IMAGE DISPLAY DEVICE

CROSS REFERENCE TO RELATED APPLICATION

This application is based upon and claims the benefit of priority from prior Japanese Patent Application No. 2006-289709, filed on Oct. 25, 2006, Japanese Patent Application No. 2007-147255, filed on Jun. 1, 2007, and Japanese Patent Application No. 2007-26849 filed on Oct. 9, 2007; the entire contents of which are incorporated herein by reference.

BACKGROUND OF THE INVENTION

1. Field of the Invention

The present invention relates to an image signal processor and an image display device that generate a red output signal, a green output signal, a blue output signal and a fourth color output signal in accordance with a red input signal corresponding to a red light component, a green input signal corresponding to a green light component and a blue input signal corresponding to a blue light component.

2. Description of the Related Art

Conventionally, there has been widely known a three-panel projection type image display device provided with a red liquid crystal panel configured to modulate a red light component, a green liquid crystal panel configured to modulate a green light component and a blue liquid crystal panel configured to modulate a blue light component.

Moreover, for the purpose of improving luminance and of reducing power consumption of light source, there has been proposed a projection type image display device that utilizes a fourth color light component (such as a white light component) in addition to the red light component, the green light component and the blue light component (for example, refer to Japanese Patent Publication No. 2004-280108 (claim 1, paragraph [0020], FIG. 5 or the like)).

Specifically, in a projection type image display device, an improvement in luminance of image projected on a screen and a reduction in power consumption of light source are achieved by substituting the white light component for the luminance components of the red light component, the green light component and the blue light component.

In the case of the aforementioned projection type image display device, however, an appropriate expansion of the color reproduction range of image cannot be achieved although the luminance of image projected on a screen can be improved by adding the white light component.

With this regard, the present invention is made to resolve the aforementioned problem. An object of the present invention is to provide an image signal processor and an image display device that make it possible to achieve the appropriate expansion of the color reproduction range of image.

SUMMARY OF THE INVENTION

A first aspect of an image signal processor includes: a controller (controller 130) configured to generate a red output signal (red output signal $R_{out}$) a green output signal (green output signal $G_{out}$), a blue output signal (blue output signal $B_{out}$) and a fourth color output signal (yellow output signal $Ye_{out}$) in accordance with image input signals including a red input signal (red input signal $R_{in}$) corresponding to a red light component, a green input signal (green input signal $G_{in}$) corresponding to a green light component and a blue input signal (blue input signal $B_{in}$) corresponding to a blue light component, and to output the red output signal, the green output signal, the blue output signal and the fourth color output signal. Furthermore, a fourth color light component enables to reproduce a color outside the range of a color reproducible by the red light component, the green light component and the blue light component. Moreover, the controller generates the fourth color output signal on the basis of a reference signal that is a signal, among the image input signals, corresponds to a color different from a complementary color of a color reproduced by the fourth light component.

According to the first aspect, the fourth light component is a light that can reproduce a color outside the range of a color reproducible by the red light component, the green light component and the blue light component. Furthermore, the controller generates the fourth color output signal on the basis of a signal corresponding to a color different from a complementary color of a color reproduced by the fourth light component, among the red input signals, the blue input signal and the green input.

Accordingly, it is possible to suppress disruption of color balance of the image while improving a color reproducibility of image by utilizing the fourth color light component. Specifically, it is possible to achieve an appropriate expansion of the color reproduction range of image.

In the first aspect, the controller generates the fourth color output signal by using a color reproduction parameter $\alpha$ for controlling the light amount of the fourth light component. Moreover, the color reproduction parameter $\alpha$ is a parameter (refer to FIG. 5A) determined that the light amount of the fourth color light component is increased along with an increase in color saturation of an image.

In the first aspect, the controller generates the fourth color output signal by using a luminance parameter $\beta_1$ for controlling the light amount of the fourth light component. Moreover, the luminance parameter $\beta_1$ is determined that (refer to FIG. 5B) the light amount of the fourth color light component is decreased along with an increase in color saturation of an image.

In the first aspect, the controller generates the fourth color output signal by using a luminance parameter $\beta_2$ for controlling the light amount of the fourth light component. Moreover, the luminance parameter $\beta_2$ is determined (refer to FIG. 5C) that the light amount of the fourth color light component is increased until the luminance of an image reaches a predetermined threshold value, and the light amount of the fourth color light component is decreased after the luminance of the image exceeds the predetermined threshold value.

In the first aspect, on the basis of a correlation between a target region that is to be controlled and an adjacent region adjacent to the target region, the controller generates the fourth color output signal corresponding to the target region.

In the first aspect, on the basis of a correlation between a target region that is to be controlled and an adjacent region adjacent to the target region, the controller controls a subtraction amount of the reference signal corresponding to the target region.

In the first aspect, the controller detects, on the basis of the image input signal, an edge that is a boundary of a high luminance region and a low luminance region, increases the output signal for the fourth color corresponding to the target region when the target region is included in the high luminance region, and decreases the output signal for the fourth color corresponding to the target region when the target region is included in the low luminance region.

In the first aspect, the controller detects, on the basis of the image input signal, an edge that is a boundary of a high luminance region and a low luminance region, decreases the subtraction amount of the reference signal corresponding to the target region when the target region is included in the high luminance region, and increases the subtraction amount of the reference signal corresponding to the target region when the target region is included in the low luminance region.

In the first aspect, the controller detects a background region and a foreground region on the basis of the image input signal, and generates the fourth color output signal so that among the background region and the foreground region, the light amount of the fourth color light component in a region where a motion vector is small is greater than the light amount of the fourth color light component in a region where the motion vector is large.

In the first aspect, the controller calculates a subtraction amount of the reference signal in accordance with the fourth color output signal, and calculates, in accordance with the difference between the fourth color output signal and the subtraction amount of the reference signal, an increasing amount of a signal, among the image input signals, that corresponds to a complementary color of a color reproduced by the fourth color light component.

A second aspect of an image display device includes: the controller according to above aspects; and an image display unit configured to display image on the basis of the red output signal, the green output signal, the blue output signal and the fourth color output signal, which are outputted from the controller.

BRIEF DESCRIPTION OF THE DRAWINGS

FIG. 15 is a diagram for describing a target region and an adjacent region according to a third embodiment.

FIG. 17 is a diagram fir describing a calculation example of an output signal according the third embodiment.

FIG. 21 is a diagram showing a combination of the liquid crystal panel 30Ye and a polarizing plate 231G according to the fifth embodiment.

DETAILED DESCRIPTION OF THE INVENTION

Figure 1:
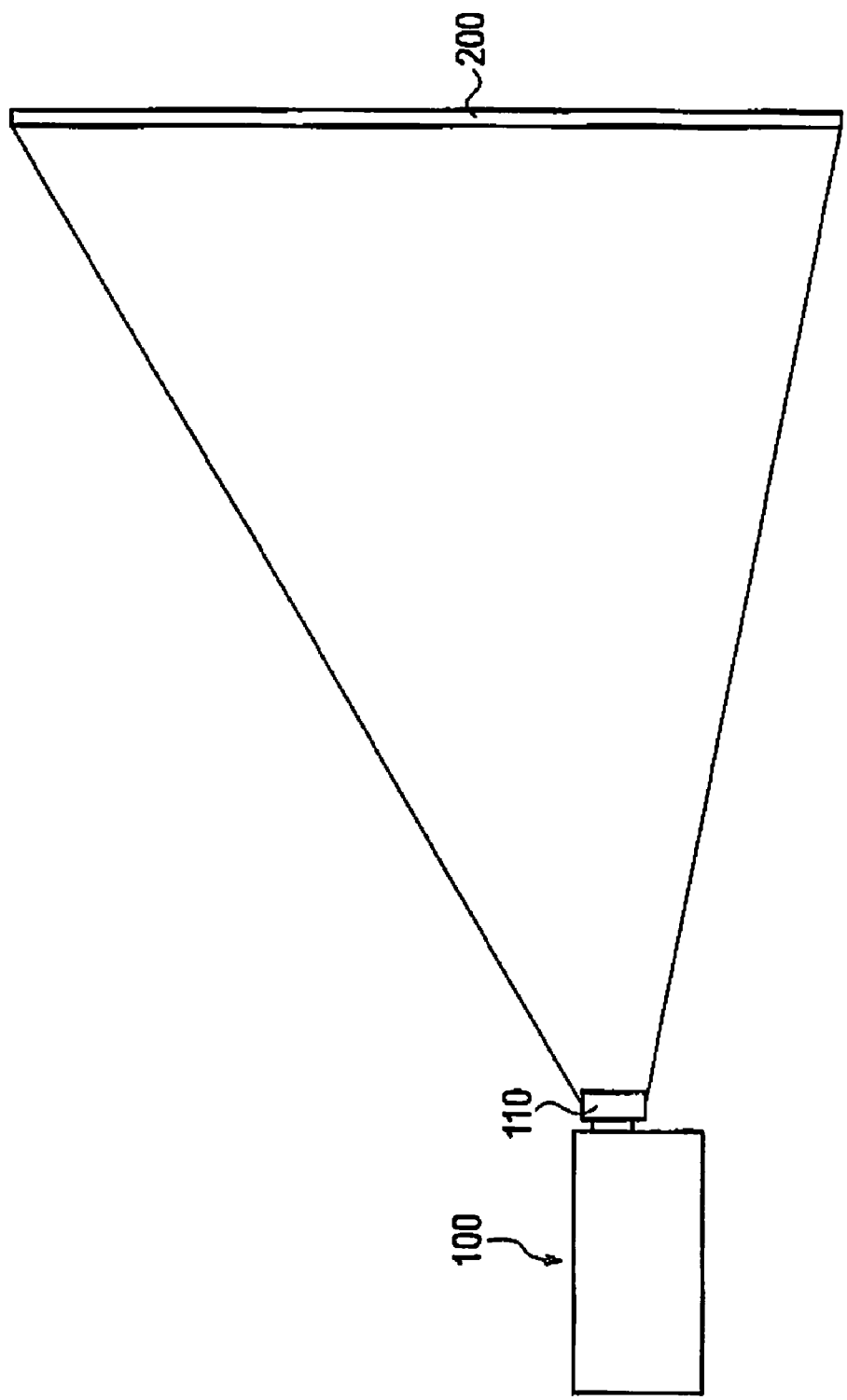
FIG. 1 is a diagram showing an overview of a projection type image display device 100 according to a first embodiment.

Hereinafter, descriptions will be given of embodiments according to the present invention with reference to the accompanying drawings. It should be noted that identical elements are denoted by the identical reference numerals in the descriptions of the drawings below.

It is, however, to be noted that the drawings are only schematic representations, and that dimensional ratios and others are different from actual ones. It is thus to be understood that specific dimensions and others should be determined in consideration of the descriptions provided below. In addition, it is to be understood that there may be a difference in the relation or ratio between dimensions in the drawings when they are cross-referred.

First Embodiment

Overview of Projection Type Image Display Device

Hereinafter, a description will be given of an overview of a projection type image display device according to a first embodiment with reference to the drawings. FIG. 1 is a diagram showing an overview of a projection type image display device 100 according to the first embodiment.

As shown in FIG. 1, the projection type image display device 100 includes a projection lens 110 and is configured to project, on a screen 200, an image light enlarged by the projection lens 110. The projection type image display device 100 utilizes a yellow light component Ye as well as a red light component R, a green light component G and a blue light component B, as will be described later.

Overview Configuration of Illumination Unit

Figure 2:
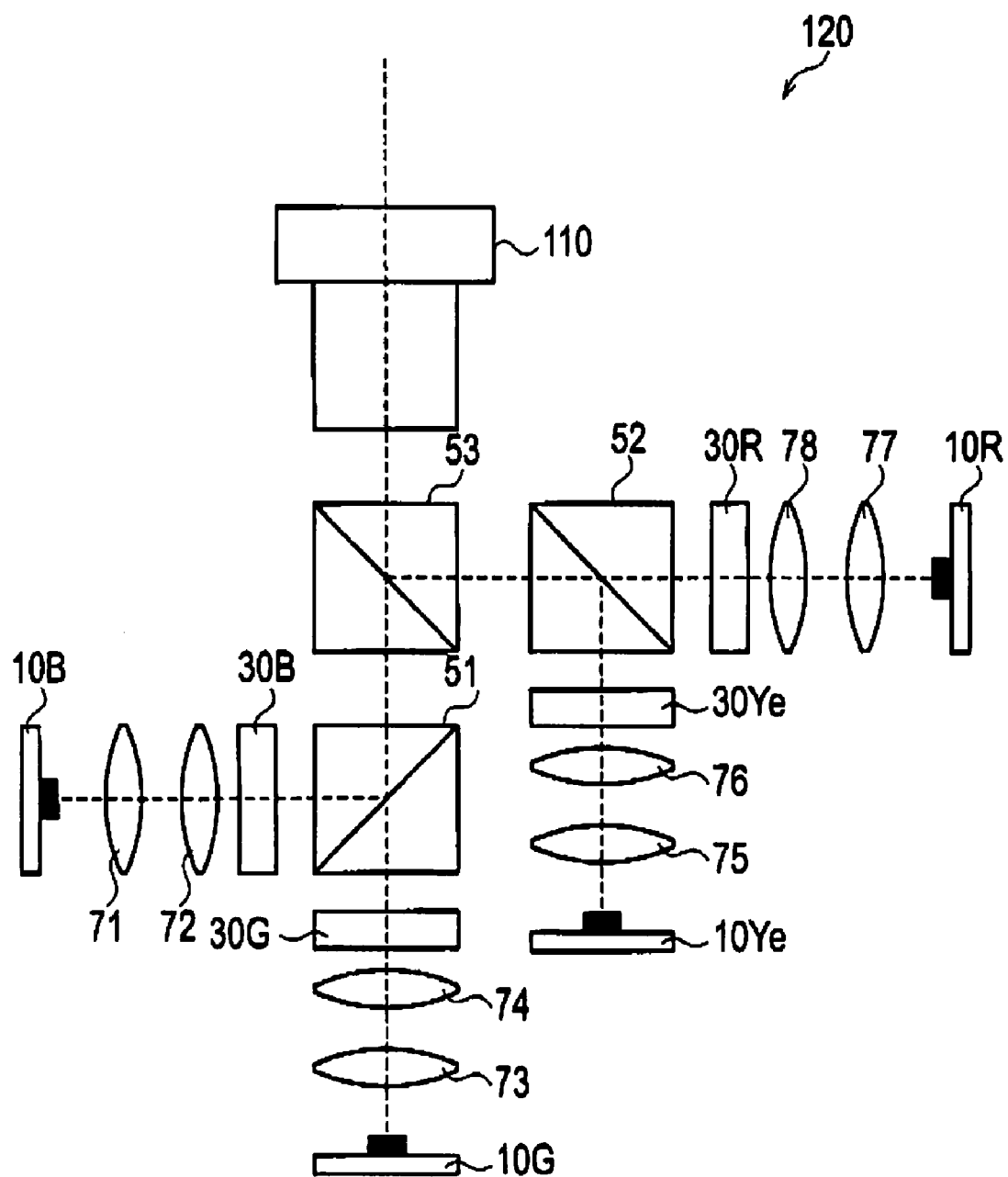
FIG. 2 is a diagram showing an illumination unit 120 according to the first embodiment.

Hereinafter, a description will be given of an overview configuration of an illumination unit according to the first embodiment with reference to the drawings. FIG. 2 is a diagram showing the overview configuration of an illumination unit 120 according to the first embodiment. It should be noted that a fly-eye lens, which uniforms light emitted from a light source 10, a polarized beam splitter (PBS), which aligns polarization directions of light emitted from the light source 10, and the like are omitted in FIG. 2.

As shown in FIG. 2, the illumination unit 120 includes a plurality of light sources 10 (light sources 10R, 10G, 10B and 10Ye), a plurality of liquid crystal panels 30 (liquid crystal panels 30R, 30G, 30B and 30Ye), a plurality of dichroic cubes (dichroic cubes 51 to 53), a plurality of lenses (lenses 71 to 78) and the projection lens 110.

The light source 10R is a solid light source such as a light emitting diode (LED) or a laser diode (LD), which emits a red light component R. Likewise, the light sources 10G, 10B and 10Ye are solid light sources such as an LED or an LD. The light sources 10G, 10B and 10Ye respectively emit a green light component G, a blue light component B and a yellow light component Ye.

The liquid crystal panel 30R modulates the red light component R on the basis of a red output signal as will be described later. Likewise, the liquid crystal panels 30G, 30B and 30Ye modulate the green light component G, the blue light component B and the yellow light component Ye on the basis of a green output signal, a blue output signal and a yellow output signal, respectively.

Here, as will be described later, the red output signal, the green output signal and the blue output signal are signals respectively output in accordance with a red input signal, a green input signal and a blue input signal, which are provided from the outside to the projection type image display device 100. The yellow output signal is a signal generated on the basis of the red input signal and the green input signal. It is to be noted that the red input signal and the green input signal are signals (reference signals) corresponding to a color that is different from a complementary color (blue B) of the yellow color Ye to be reproduced by the yellow light component Ye.

The dichroic cube 51 combines the blue light component B output from the liquid crystal panel 30B and the green light component G output from the liquid crystal panel 30G, The dichroic cube 51 outputs the combined light obtained by combining the blue light component B and the green light component G towards the dichroic cube 53.

The dichroic cube 52 combines the yellow light component Ye output from the liquid crystal panel 30Ye and the red light component R output from the liquid crystal panel 30R. The dichroic cube 52 outputs the combined light obtained by combining the yellow light component Ye and the red light component R towards the dichroic cube 53.

The dichroic cube 58 further combines the combined light obtained by the dichroic cube 51 and the combined light obtained by the dichroic cube 52. The dichroic cube 53 outputs a combined light obtained by combining the red light component R, the green light component G, the blue light component B and the yellow light component Ye towards the projection lens 110.

The lenses 71 and 72 collect the blue light component B emitted from the light source 10B and then irradiates the liquid crystal panel 30B with the blue light component B. The lenses 73 and 74 collect the green light component G emitted from the light source G and then irradiates the liquid crystal panel 30G with the green light component G. The lenses 75 and 76 collect the yellow light component Ye emitted from the light component 10Ye and then irradiates the liquid crystal panel 30Ye with the yellow light component Ye. The lenses 77 and 78 collect the red light component R emitted from the light source 10R and then irradiates the liquid crystal panel 30R with the red light component R.

Figure 3:
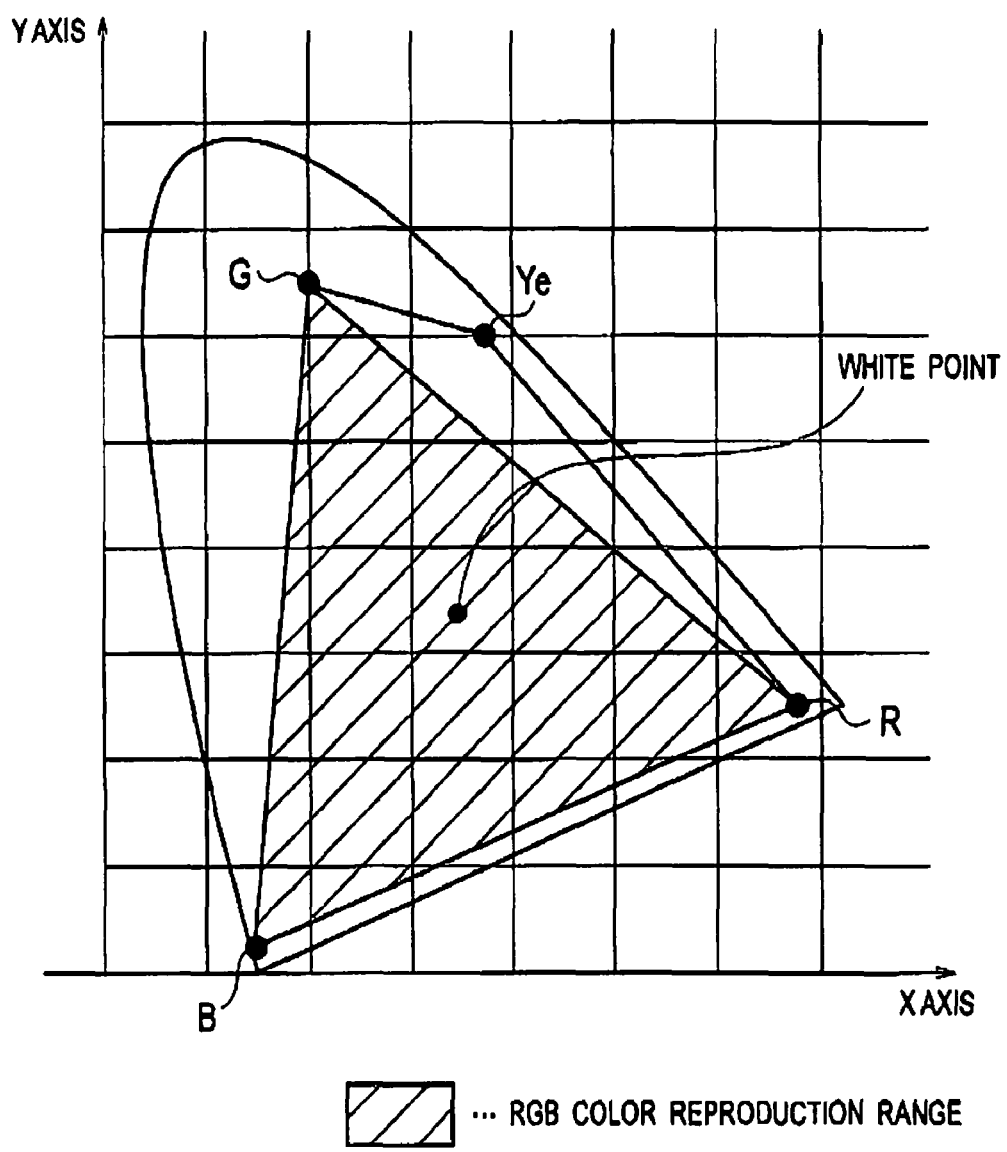
FIG. 3 is a diagram showing an RGB color reproduction range according to the first embodiment.

Here, as shown in FIG. 3, the yellow light component Ye can reproduce a color outside the range of a color reproducible by the red light component R, the green light component G and the blue light component B (RGB color reproduction range). Moreover, the yellow color Ye reproduced by the yellow light component Ye is a complementary color of the blue color B reproduced by the blue light component B. The yellow color Ye reproduced by the yellow light component Ye can be replaced with the red color reproduced by the red light component R and the green color 0 reproduced by the green light component G.

Functions of Projection Type Image Display Device

Figure 4:
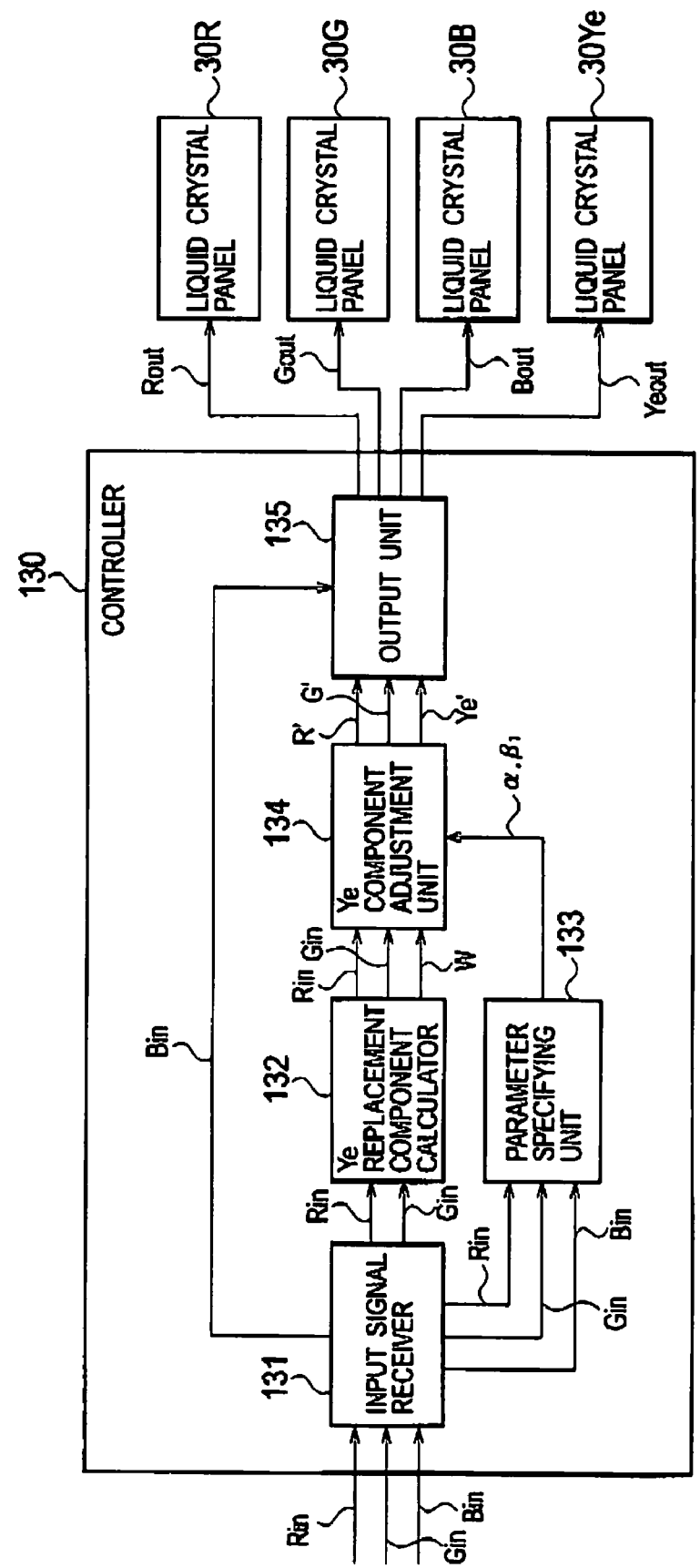
FIG. 4 is a block diagram showing a configuration of a controller 130 according to the first embodiment.

Hereinafter, a description will be given of functions of the projection type image display device with reference to the drawings. FIG. 4 is a block diagram showing the functions of the projection type image display device 100 (controller 130) according to the first embodiment.

As shown in FIG. 4, the controller 130 includes an input signal receiver 131, a Ye replacement component calculator 132, a parameter specifying unit 133, a Ye component adjustment unit 134 and an output unit 135.

The input signal receiver 131 is configured to obtain a red input signal $R_{in}$, a green input signal $G_{in}$ and a blue input signal $B_{in}$. The input signal receiver 131 inputs the red input signal $R_{in}$, the green input signal $G_{in}$ and the blue input signal $B_{in}$, to the parameter specifying unit 133. The input signal receiver 131 inputs the red input signal $R_{in}$ and the green input signal $G_{in}$ to the Ye replacement component calculator 132.

It should be noted that a reverse y correction is added to the red input signal $R_{in}$, to the green input signal $G_{in}$ and to the blue input signal $B_{in}$ before the signals are inputted to the input signal receiver 131.

The Ye replacement component calculator 132 is configured to calculate a Ye replacement signal W corresponding to a component (Ye replacement component) that is a component of the red color light component R and the green light component G, substitutable with the yellow light component Ye.

Here, the red light component R and the green light component G are substitutable with the yellow light component Ye having the light amount equal to those of the red light component R and the green light component G. Accordingly, the red input signal $R_{in}$ and the green input signal $G_{in}$ are substitutable with the Ye replacement signal W having a signal strength equal to those of the red input signal $R_{in}$ and the green input signal $G_{in}$.

Accordingly, the Ye replacement component calculator 132 calculates the Ye replacement signal on the basis of the red input signal $R_{in}$ and the green input signal $G_{in}$ in accordance with the following formula 1.

[Equation 1]

$$W=\min(R_{in}, G_{in}) \qquad \text{(Formula 1)}$$

It should be noted that $\min(R_{in}, G_{in})$ is an input signal having a lower signal strength among the red input signal $R_{in}$ and the green input signal $G_{in}$.

The Ye replacement component calculator 132 inputs the red input signal $R_{in}$, the green input $G_{in}$ and the Ye replacement signal W, to the Ye component adjustment unit 134.

The parameter specifying unit 133 is configured to calculate color saturation and luminance of image (red color R, green color G, blue color B and yellow color Ye) to be reproduced by the red input signal $R_{in}$, the green input signal $G_{in}$ and the blue input signal $B_{in}$. Subsequently, the parameter specifying unit 133 specifies a color reproduction parameter $\alpha$ and a luminance parameter $\beta_1$ with reference to FIGS. 5A to 5C, and then inputs the specified color reproduction parameter $\alpha$ and luminance parameter $\beta_1$ to the Ye component adjustment unit 134.

Figure 5A:
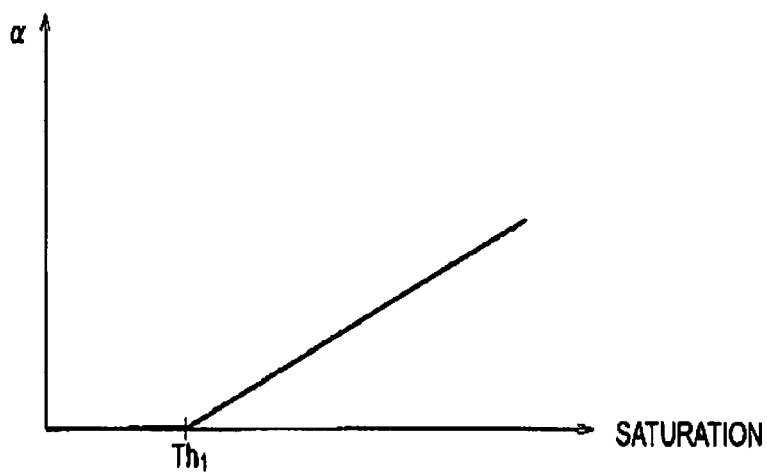
FIGS. 5A to 5C are diagrams respectively showing a color reproduction parameter α, a luminance parameters and a luminance parameter $\beta_2$ according to the first embodiment.

Specifically, as shown in FIG. 5A, the color reproduction parameter $\alpha$ is constant until the color saturation of image (specifically, the yellow Ye) becomes $Th_1$. On the other hand, the color reproduction parameter a is determined to increase along with an increase in the color saturation of image after the color saturation of the image exceeds $Th_1$. Specifically, when the distance between the color saturation of image and the white point is greater than a certain distance, the color reproduction parameter α is determined so that the more distance from the white point the color saturation of image becomes, the larger the light amount of the yellow light component Ye may become. Thereby, the color reproducibility of image improves since the yellow color Ye, which is in a range where the yellow color Ye cannot be reproduced by the red light component R and the green light component G, can be reproduced by the yellow light component Ye.

It should be noted that the white point is a point where color light components are combined when reproducing a white color.

Figure 5B:
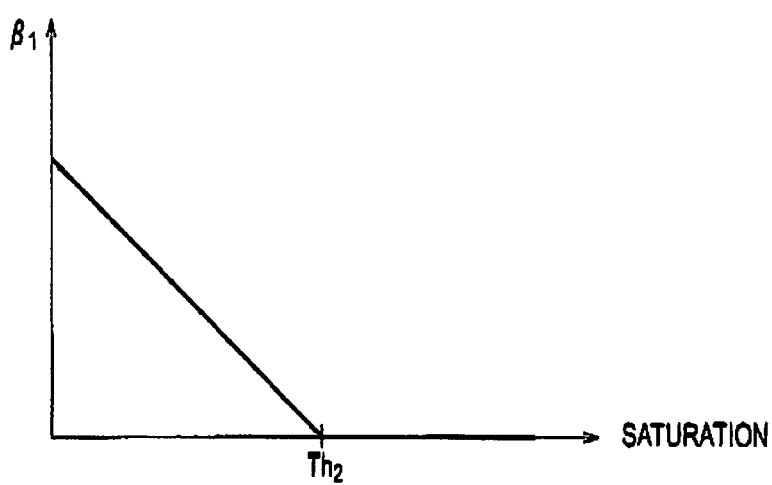

As shown in FIG. 5B, the luminance parameter $\beta_1$ is determined to decrease along with an increase in the color saturation of image until the color saturation of image (specially, blue color B) becomes $Th_2$. On the other hand, the luminance parameter $\beta_1$ is constant after the color saturation of image exceeds $Th_2$. Specifically, when the distance between the color saturation of image and the white point is within a certain distance, the luminance parameter $\beta_1$ is determined that the more distance from the white point the color saturation of image becomes, the smaller the light amount of the yellow light component Ye may become.

Figure 5C:
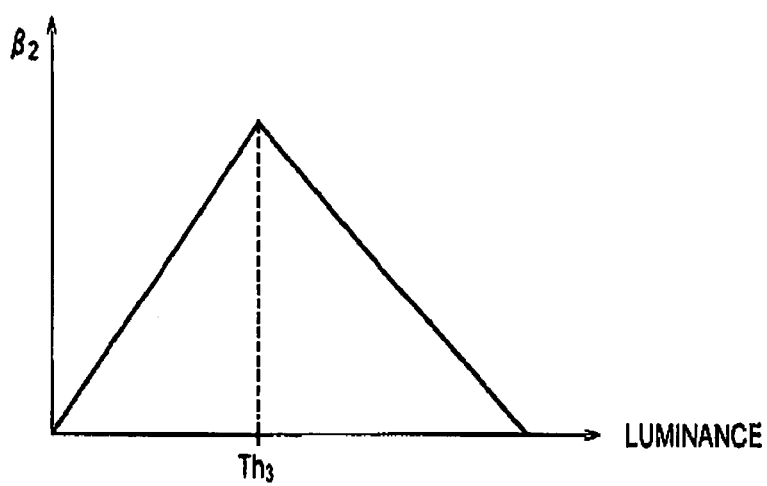

As shown in FIG. 5C, the luminance parameters $\beta_2$ is determined to increase until the luminance of image becomes $Th_3$ and to decrease after the luminance of image exceeds $Th_3$. Specifically, the luminance parameter $\beta_2$ is determined that the light amount of the yellow light component Ye becomes at its peak when the luminance of image is at $Th_3$ and starts decreasing thereafter. Thereby, the occurrence of "poor black reproduction" in a case where the luminance of image is low, and the occurrence of "white spot" in a case where the luminance of image is high, can be suppressed.

The Ye component adjustment unit 134 is configured to calculate a red adjustment signal R', a green adjustment signal G' and a yellow adjustment signal Ye' on the basis of the red input signal $R_{in}$, the green input signal $G_{in}$ and the Ye replacement signal W. Here, in the first embodiment, the Ye component adjustment unit 134 uses the color reproduction parameter α and the luminance parameter $\beta_1$ in the calculation of the red adjustment signal R', the green adjustment signal G' and the yellow adjustment signal Ye'. Specifically, the Ye component adjustment unit 134 calculates the red adjustment signal R', the green adjustment signal G' and the yellow adjustment signal Ye' in accordance with the following (Formula 2) to (Formula 4).

[Equation 2]

$$R' = R_{in} - W \times \alpha \quad \text{(Formula 2)}$$

$$G' = G_{in} - W \times \alpha \quad \text{(Formula 8)}$$

$$Ye' = W \times (\alpha + \beta_1) \quad \text{(Formula 4)}$$

The output unit 135 outputs a red output signal $R_{out}$, a green output signal $G_{out}$, a blue output signal $B_{out}$ and a yellow output signal $Ye_{out}$ to the respective liquid crystal panels 30. Specifically, the output unit 135 outputs the red adjustment signal R' as a red output signal $R_{out}$ to the liquid crystal panel 30R. Likewise, the output unit 135 outputs the green adjustment signal G' as a green output signal $G_{out}$ and the yellow adjustment signal Ye' as a yellow output signal $Ye_{out}$ to the liquid crystal panel 30G and the liquid crystal panel 30Ye, respectively. On the other hand, the output unit 135 outputs the blue input signal $B_{in}$ as a blue output signal $B_{out}$ at it is, to the liquid crystal panel 30B.

It should be noted that a Y correction is added to the red output signal $R_{out}$, to the green output signal $G_{out}$, to the blue output signal $B_{out}$ and to the yellow output signal $Ye_{out}$ before the signals are inputted to the respective liquid crystal panels 30.

Operation of Projection Type Image Display Device

Figure 6:
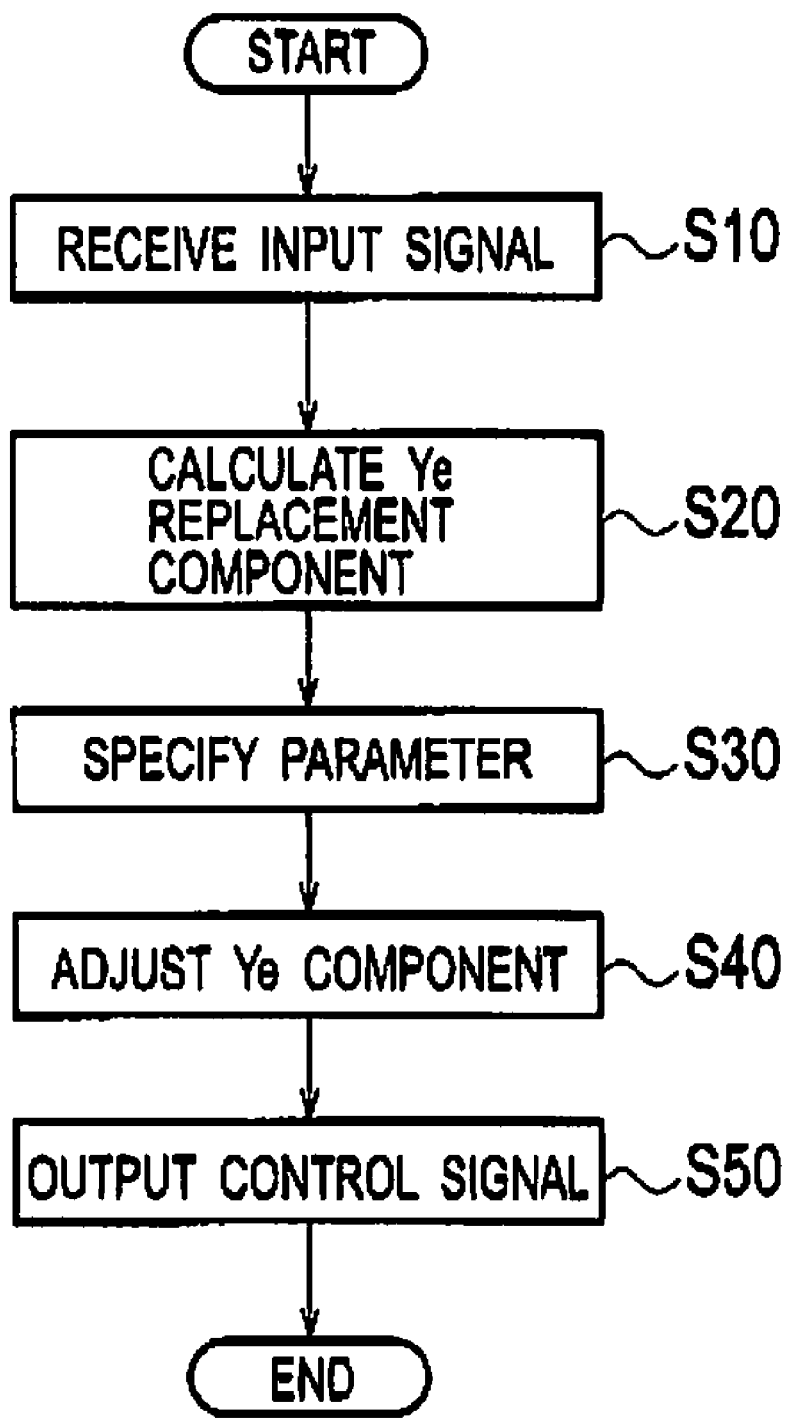
FIG. 6 is a flowchart showing an operation of the projection type image display device 100 according to the first embodiment.

Hereinafter, a description will be given of an operation of the projection type image display device according to the first embodiment with reference to the drawings. FIG. 6 is a flowchart showing the operation of the projection type image display device 100 according to the first embodiment.

As shown in FIG. 6, in step 10, the projection type image display device 100 receives a red input signal $R_{in}$, a green input signal $G_{in}$ and a blue input signal $B_{in}$.

In step 20, the projection type image display device 100 calculates the Ye replacement signal W on the basis of the red input signal $R_{in}$ and the green input signal $G_{in}$. Specifically, the projection type image display device 100 calculates the Ye replacement signal W in accordance with the following (Formula 1).

[Equation 3]

$$W = \min(R_{in}, G_{in}) \quad \text{(Formula 1)}$$

It should be noted that $\min(R_{in}, G_{in})$ is an input signal having lower signal strength among the red input signal $R_{in}$ and the green input signal $G_{in}$.

In step 30, the projection type image display device 100 specifies the color reproduction parameter α, and the luminance parameter $\beta_1$ on the basis of the color saturation of and the luminance of the image. Specifically, the projection type image display device 100 specifies the luminance parameter $\beta_1$ with reference to the aforementioned FIGS. 5A to 5C.

In step 40, the projection type image display 100 calculates the red adjustment signal R', the green adjustment signal G' and the yellow adjustment signal Ye' on the basis of the Ye replacement signal W. Specifically, the projection type image display device 100 calculates each of the adjustment signals respectively, in accordance with the following (Formula 2) to (Formula 4).

[Equation 4]

$$R' = R_{in} - W \times \alpha \quad \text{(Formula 2)}$$

$$G' = G_{in} - W \times \alpha \quad \text{(Formula 3)}$$

$$Ye' = W \times (\alpha + \beta_1) \quad \text{(Formula 4)}$$

In step 50, the projection type image display device 100 outputs the red output signal $R_{out}$, the green output signal $G_{out}$, the blue output signal $B_{out}$ and the yellow output signal $Ye_{out}$. Specifically, the projection type image display device 100 outputs the red adjustment signal R' as a red output signal $R_{out}$ to the liquid crystal panel 30R. Likewise, the projection type image display device outputs the green adjustment signal G' as a green output signal $G_{out}$ and the yellow adjustment signal Ye' as a yellow output signal $Ye_{out}$ to the liquid crystal panel 30G and the liquid crystal panel 30Ye, respectively. In the meantime, the projection type image display device 100 outputs the blue input signal $B_{in}$ as a blue output signal $B_{out}$ as it is, to the liquid crystal panel 30B.

Effects and Advantages

According to the projection type image display device 100 in the case of the first embodiment, the yellow light component Ye reproduces a color outside an RGB color reproduction range, which can be reproduced by the red light component R, the green light component G and the blue light component B. Moreover, in this case, the controller 130 generates the yellow output signal $Ye_{out}$ on the basis of the red input signal $R_{in}$ and the green input signal $G_{in}$, which correspond to colors (red color R and green color G) different from a complementary color (blue B) of the color reproduced by the yellow light component Ye among the red input signal $R_{in}$, the green input signal $G_{in}$ and the blue input signal $B_{in}$.

Accordingly, the disruption of color balance can be suppressed while the color reproducibility of image is improved by utilizing the yellow light component Ye. In other words, an appropriate expansion of the color reproducibility of image can be achieved.

The controller 130 generates the yellow output signal $Ye_{out}$ by using the color reproduction parameter α determined that the light amount of the yellow light component Ye can be increased along with an increase in the color saturation of image (specifically, the yellow color Ye). Accordingly, the color reproducibility of image can be effectively improved.

The controller 130 generates the yellow output signal $Ye_{out}$ by using the luminance parameter $β_1$ determined that the light amount of the yellow light component Ye can be decreased along with the increase of the color saturation of image. Accordingly, when the color saturation of image (specifically; blue color B) is high, the luminance of image near the white point can be improved while reduction in the color purity by the yellow light component Ye is suppressed.

Moreover, when the controller 130 generates the yellow output signal $Ye_{out}$ by using the luminance parameter $β_3$ determined that the light amount of the yellow light component Ye can be decreased after the peak of which the luminance of image is $Th_3$, "poor black reproduction" in a case where the luminance of image is low, or "white spot" in a case where the luminance of image is high, can be suppressed.

Second Embodiment

Hereinafter, a description will be given of a second embodiment with reference to the drawings. The description below will be mainly given of differences between the aforementioned first embodiment and the second embodiment.

Specifically, in the case of the aforementioned first embodiment, the projection type image display device 100 outputs the blue input signal $B_{in}$ as a blue output signal $B_{out}$ as it is, to the liquid crystal panel 30B. On the other hand, in the case of the second embodiment, the projection type image display device 100 adjusts the red output signal $R_{out}$, the green output signal $G_{out}$, the blue output signal $B_{out}$ and the yellow output signal $Ye_{out}$ in consideration of luminosity factors of the red light component R, the green light component G, the blue light component B and the yellow light component Ye.

Functions of Projection Type Image Display Device

Figure 7:
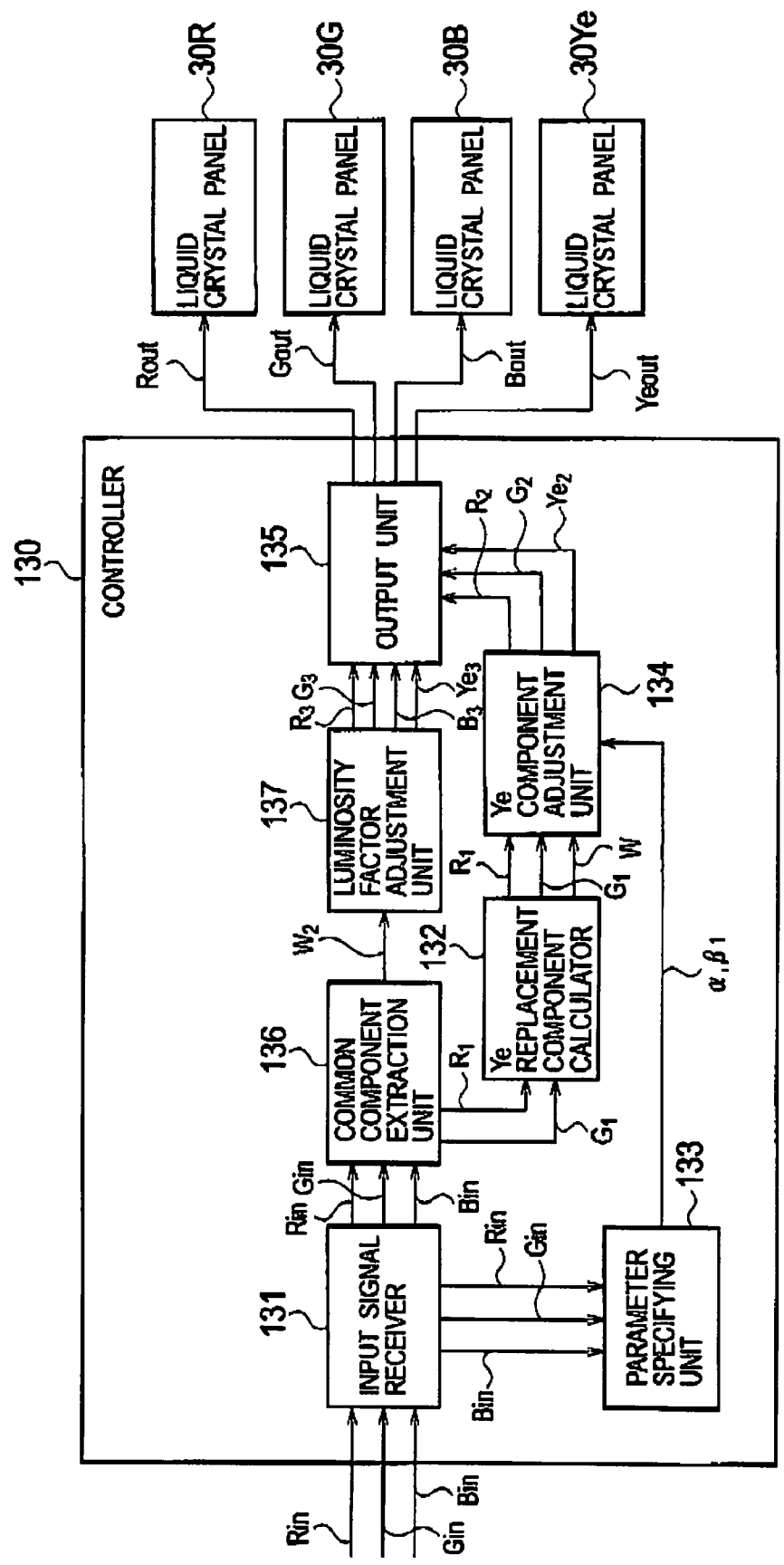
FIG. 7 is a block diagram showing a configuration of a controller 130 according to a second embodiment.

Hereinafter, a description will be given of functions of the projection type image display device according to the second embodiment with reference to the drawings. FIG. 7 is a block diagram showing the functions of the projection type image display device 100 (the controller 130) according to the second embodiment. It should be noted that in FIG. 7, the same reference numerals as those in FIG. 4 are assigned to the components that are the same as those in FIG. 4.

As shown in FIG. 7, the controller 130 includes a common component extraction unit 136, and a luminosity factor adjustment unit 137 in addition to the components shown in FIG. 4.

The common component extraction unit 136 is configured to extract a signal strength common component $W_2$, which is common to the red input signal $R_{in}$, to the green input signal $G_{in}$ and to the blue input signal $B_{in}$. Specifically, the common component extraction unit 136 calculates the signal strength common component $W_2$ in accordance with the following (Formula 5).

[Equation 5]

$$W_2 = \min(R_{in}, G_{in}, B_{in}) \quad \text{(Formula 5)}$$

It should be noted that $\min(R_{in}, G_{in}, B_{in})$ is an input signal having a low signal strength among the red input signal $R_{in}$, the green input signal $G_{in}$ and the blue input signal $B_{in}$. It should be noted that, in the second embodiment, the blue input signal is an input signal having the signal strength lower than those of the red input signal $R_{in}$ and the green input signal $G_{in}$.

Subsequently, the common component extraction unit 136 calculates a red intermediate signal $R_1$ and a green intermediate signal $G_1$ by excluding the signal strength common component $W_2$ from the red input signal $R_{in}$ and the green input signal $G_{in}$. Specifically, the common component extraction unit 136 calculates the red intermediate signal $R_1$ and the green intermediate signal $G_1$ in accordance with the following (Formula 6) to (Formula 8), respectively.

[Equation 6]

$$R_1 = R_{in} - W_2 \quad \text{(Formula 6)}$$

$$G_1 = G_{in} - W_2 \quad \text{(Formula 7)}$$

$$B_1 = B_{in} - W_2 \quad \text{(Formula 8)}$$

It should be noted that since the signal strength of the blue input signal $B_{in}$ is lower than those of the red input signal $R_{in}$ and the green input signal $G_{in}$ in the second embodiment, $B_1$ becomes "0" as a matter of course.

The luminosity factor adjustment unit 137 is configured to calculate, on the basis of the signal strength common component $W_2$, a red intermediate signal $R_3$, a green intermediate signal $G_3$, a blue intermediate signal $B_3$ and a yellow intermediate signal $Ye_3$ on the basis of the signal strength common component $W_2$, in consideration of the luminosity factors of the red light component R, the green light component G, the blue light component B and the yellow light component Ye. Here, the luminosity factor adjustment unit 137 calculates the red intermediate signal $R_3$, the green intermediate signal $G_3$, the blue intermediate signal $B_3$ and the yellow intermediate signal $Ye_3$ by using ratios in which the luminosity factors of the red light component R, the green light component G, the blue light component B and the yellow light component Ye (for example, ratio for red, $r_R = 187/255$, ratio for green, $r_G = 255/255$, ratio for blue, $r_B = 128/255$, and ratio for yellow, $r_{Ye} = 255/255$) are taken into consideration. Specifically, the luminosity factor adjustment unit 137 calculates the red intermediate signal $R_3$, the green intermediate signal $G_3$, the blue intermediate signal $B_3$ and the yellow intermediate signal $Ye_3$ in accordance with the following (formula 9) to (formula 12), respectively.

[Equation 7]

$$R_3 = W_2 \times r_R \quad \text{(Formula 9)}$$

$$G_3 = W_2 \times r_G \quad \text{(Formula 10)}$$

$$B_3 = W_2 \times r_B \quad \text{(Formula 11)}$$

$$Ye_3 = W_2 \times r_{Ye} \quad \text{(Formula 12)}$$

The aforementioned Ye replacement component calculator 132 calculates a Ye replacement signal W corresponding to the component (Ye replacement component) that can substitute the red light component R and the green light component G with the yellow light component Ye. Specifically, the Ye replacement component calculator 132 calculates the Ye replacement signal W on the basis of the red intermediate signal $R_1$ and the green intermediate signal $G_1$ in accordance with the following (Formula 13).

[Equation 8]

$$W = \min(R_1, G_1) \quad \text{(Formula 13)}$$

It should be noted that $\min(R_1, G_1)$ is an input signal having a low signal strength among the red intermediate signal $R_1$ and the green intermediate signal $G_1$.

The aforementioned Ye component adjustment unit 134 calculates a red adjustment signal $R_2$, a green adjustment signal $G_2$ and a yellow adjustment signal $Ye_2$ on the basis of the red intermediate signal $R_1$, the green intermediate signal $G_1$ and the Ye replacement signal W. Here, the Ye component adjustment unit 134 uses the color reproduction parameter $\alpha$ and the luminance parameter $\beta_1$ for calculating the red adjustment signal $R_2$, the green adjustment signal $G_3$ and the yellow adjustment signal $Ye_2$. Specifically the Ye component adjustment unit 134 calculates the red adjustment signal $R_2$, the green adjustment signal $G_2$ and the yellow adjustment signal $Ye_2$ in accordance with the following (Formula 14) to (Formula 16), respectively.

[Equation 9]

$$R_2 = R_1 - W \times \alpha \quad \text{(Formula 14)}$$

$$G_2 = G_1 - W \times \alpha \quad \text{(Formula 15)}$$

$$Ye_2 = W \times (\alpha + \beta_1) \quad \text{(Formula 16)}$$

The output unit 135 outputs the red output signal $R_{out}$, the green output signal $G_{out}$, the blue output signal $B_{out}$ and the yellow output signal $Ye_{out}$ to the respective liquid crystal panels 30. Specifically, the output unit 135 outputs a signal obtained by combining the red adjustment signal $R_2$ and the red intermediate signal $R_3$, to the liquid crystal panel 30R as a red output signal $R_{out}$. Likewise, the output signal 135 outputs a signal obtained by combining the green adjustment signal $G_2$ and the green intermediate signal $G_3$, to the liquid crystal panel 80G as a green output signal $G_{out}$. The output signal 185 outputs a signal obtained by combining the yellow adjustment signal $Ye_2$ and the yellow intermediate signal $Ye_3$, to the liquid crystal panel 30Ye as a yellow output signal $Ye_{out}$. In the meantime, the output signal 135 outputs a signal obtained by combining the blue adjustment signal $B_2$ and the blue intermediate signal $B_3$, to the liquid crystal panel 30B as a blue output signal $B_{out}$.

Operation of Projection Type Image Display Device

Figure 8:
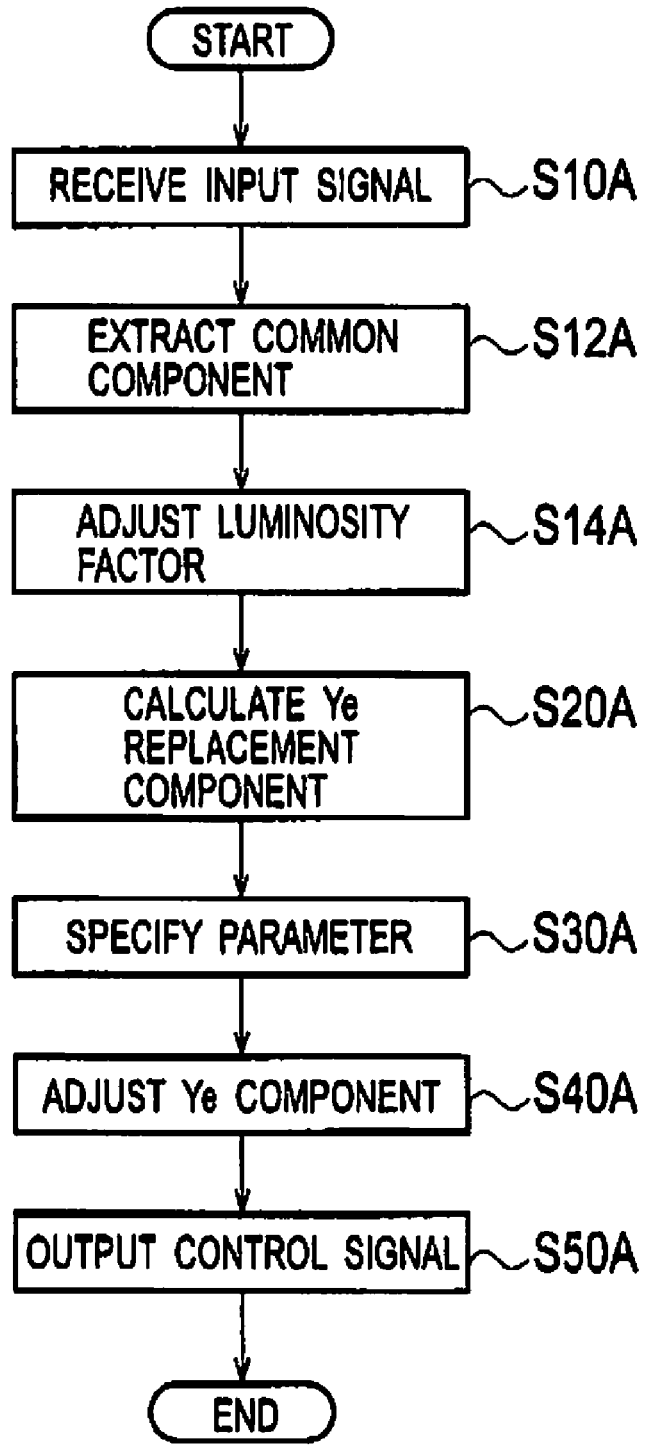
FIG. 8 is a flowchart showing an operation of a projection type image display device 100 according to the second embodiment.

Hereinafter, a description will be given of an operation of the projection type image display device according to the second embodiment with reference to the drawings. FIG. 8 is a flowchart showing an operation of the projection type image display device 100 according to the second embodiment.

As shown in FIG. 8, in step 10A, the projection type image display device 100 receives a red input signal in, a green input signal $G_{in}$ and a blue input signal $B_{in}$.

In step 12A, the projection type image display device 100 extracts a signal strength common component $W_2$, which is common to the red input signal $R_{in}$, to the green input signal $G_{in}$ and to the blue input signal $B_{in}$. Specifically, the projection type image display device 100 calculates the signal strength common component $W_2$ in accordance with the following (Formula 5).

[Equation 10]

$$W_2 = \min(R_{in}, G_{in}, B_{in}) \quad \text{(Formula 5)}$$

It should be noted that $\min(R_{in}, G_{in}, B_{in})$ is an input signal having a low signal strength among the red input signal $R_{in}$, the green input signal $G_{in}$ and the blue input signal $B_{in}$.

In step 14A, on the basis of the signal strength common component $W_2$, the projection type image display device 100 calculates the red intermediate signal $R_3$, the green intermediate signal $G_3$, the blue intermediate signal $B_3$ and the yellow intermediate signal $Ye_3$ in consideration of luminosity factors of the red light component R, the green light component G, the blue light component B and the yellow light component Ye. Specifically, the projection type image display device 100 calculates the red intermediate signal $R_3$, the green intermediate signal $G_3$, the blue intermediate signal $B_3$ and the yellow intermediate signal $Ye_3$ in accordance with the following (Formula 9) to (Formula 12), respectively.

[Equation 11]

$$R_3 = W_2 \times r_R \quad \text{(Formula 9)}$$

$$G_3 = W_2 \times r_R \quad \text{(Formula 10)}$$

$$B_3 = W_2 \times r_B \quad \text{(Formula 11)}$$

$$Y_3 = W_2 \times r_Y \quad \text{(Formula 12)}$$

It should be noted that the ratios, $r_R$ for red, $r_G$ for green, $r_B$ for blue and $r_{Ye}$ for yellow are ratios calculated in consideration of the luminosity factors of the red light component R, the green light component G, the blue light component B and the yellow light component Ye.

In step 20A, the projection type image display device 100 calculates the red intermediate signal $R_1$ and the green intermediate signal $G_1$ in accordance with the following (Formula 6) to (Formula 8).

[Equation 12]

$$R_1 = R_{in} - W_2 \quad \text{(Formula 6)}$$

$$G_1 = G_{in} - W_2 \quad \text{(Formula 7)}$$

$$B_1 = B_{in} - W_2 \quad \text{(Formula 8)}$$

Subsequently, the projection type image display device 100 calculates the Ye replacement signal W on the basis of the red intermediate signal $R_1$ and the green intermediate signal $G_1$ in accordance with the following (Formula 13).

[Equation 13]

$$W = \min(R_1, G_1) \quad \text{(Formula 13)}$$

It should be noted that $\min(R_1, G_1)$ is an input signal having a low signal strength among the red intermediate signal $R_1$ and the green intermediate signal $G_1$.

In step 30A, the projection type image display device 100 specifies the color reproduction parameter a and the luminance parameter $\beta_1$ on the basis of the color saturation of and of the luminance of image. Specifically, the projection type image display device 100 specifies the luminance parameter $\beta_1$ with reference to the information on the aforementioned FIGS. 5A to 5C.

In step 40A, the projection type image display device 100 calculates the red adjustment signal $R_2$, the green adjustment signal $G_2$ and the yellow adjustment signal $Ye_2$ on the basis of the red intermediate signal $R_1$, the green intermediate signal $G_1$ and the Ye replacement signal W. Specifically, the projection type image display device 100 calculates the red adjustment signal $R_2$, the green adjustment signal $G_2$ and the yellow adjustment signal $Ye_2$ in accordance with the following (Formula 14) to (Formula 16).

[Equation 14]

$$R_2 = R_1 - W \times \alpha \quad \text{(Formula 14)}$$

$$G_2 = G_1 - W \times \alpha \quad \text{(Formula 16)}$$

$$Ye_2 = W \times (\alpha + \beta_1) \quad \text{(Formula 16)}$$

In step 50A, the projection type image display device 100 outputs the red output signal $R_{out}$, the green output signal $G_{out}$, the blue output signal $B_{out}$ and the yellow output signal $Ye_{out}$. Specifically, the projection type image display device 100 outputs a signal obtained by combining the red adjustment signal $R_2$ and the red intermediate signal $R_3$, to the liquid crystal panel 30R as a red output signal $R_{out}$. Likewise, the projection type image display device 100 outputs a signal obtained by combining the green adjustment signal $G_2$ and the green intermediate signal $G_3$, to the liquid crystal panel 30G as a green output signal $G_{out}$. Moreover, the projection type image display device 100 outputs a signal obtained by combining the yellow adjustment signal $Ye_2$ and the yellow intermediate signal $Ye_3$, to the liquid crystal panel 30Ye as a yellow output signal $Ye_{out}$. In the meantime, the projection type image display device 100 outputs a signal obtained by combining the blue adjustment signal $B_2$ and the blue intermediate signal $B_3$, to the liquid crystal panel 30B as a blue output signal $B_{out}$.

Calculation Example of Output Signal

Figure 9:
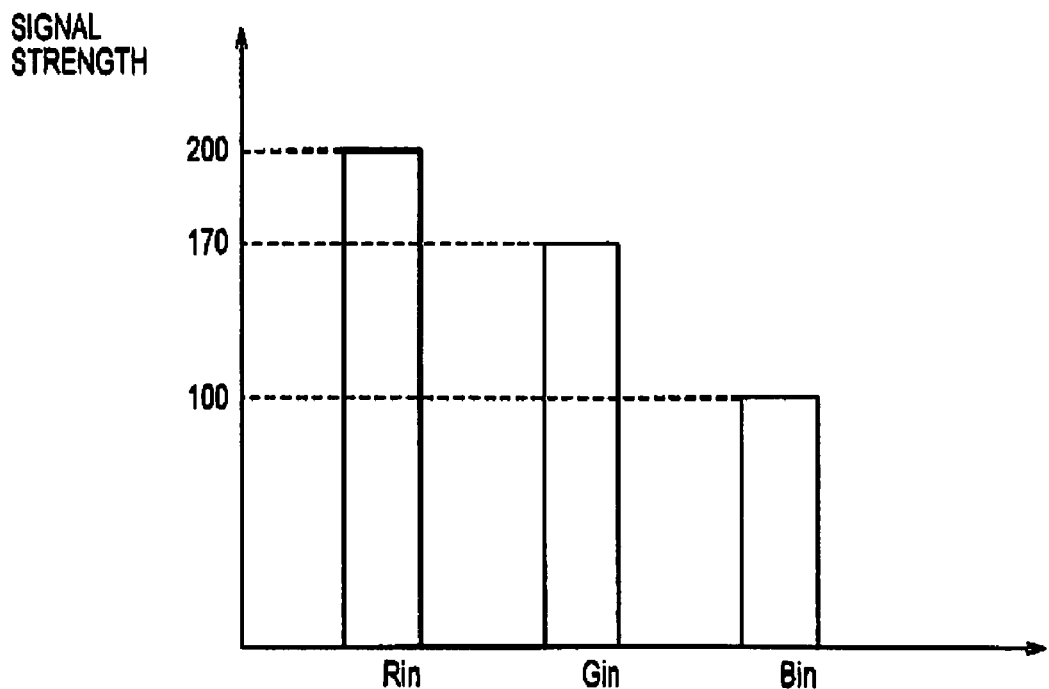
FIG. 9 is a diagram for describing a calculation example of an output signal according the second embodiment.

Hereinafter, a description will be given of a calculation example of an output signal according to the second embodiment with reference to the FIGS. 9 to 14. Specifically, the description will be given by citing, as an example, a case of calculating the red output signal $R_{out}$, the green output signal $G_{out}$, the blue output signal $B_{out}$ and the yellow output signal $Ye_{out}$ when the red input signal $R_{in}$="200," the green input signal $G_{in}$="170" and the blue input signal $B_{in}$="100" as shown in FIG. 9.

Figure 10:
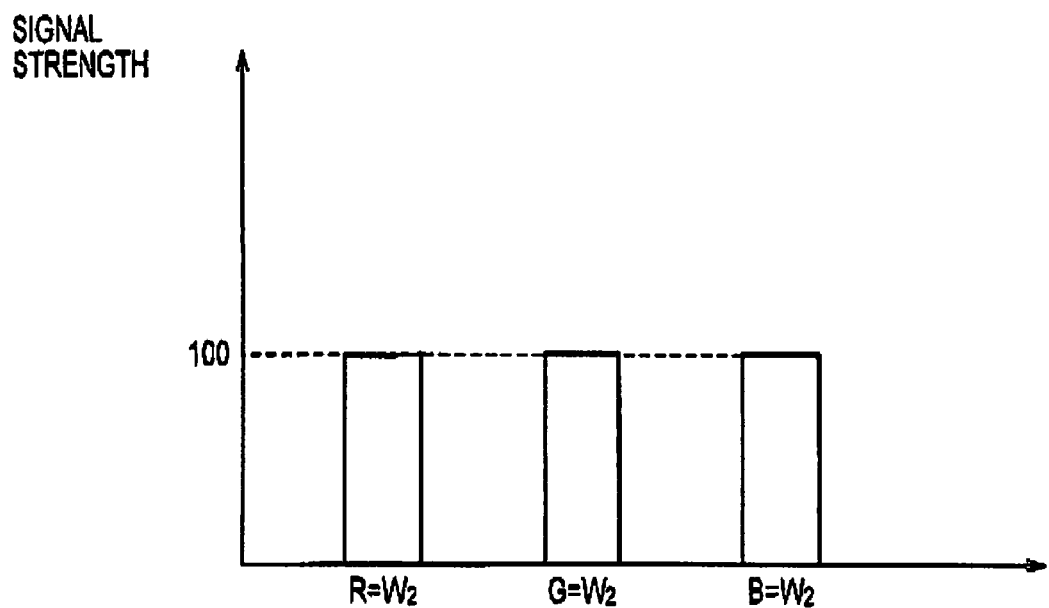
FIG. 10 is a diagram for describing a calculation example of an output signal according the second embodiment.

As shown in FIG. 10, the projection type image display device 100 calculates the signal strength common component $W_2$ in accordance with the following (Formula 5).
[Equation 15]

$$W_2 = \min(R_{in}, G_{in}, B_{in}) \quad \text{(Formula 5)}$$

Figure 11:
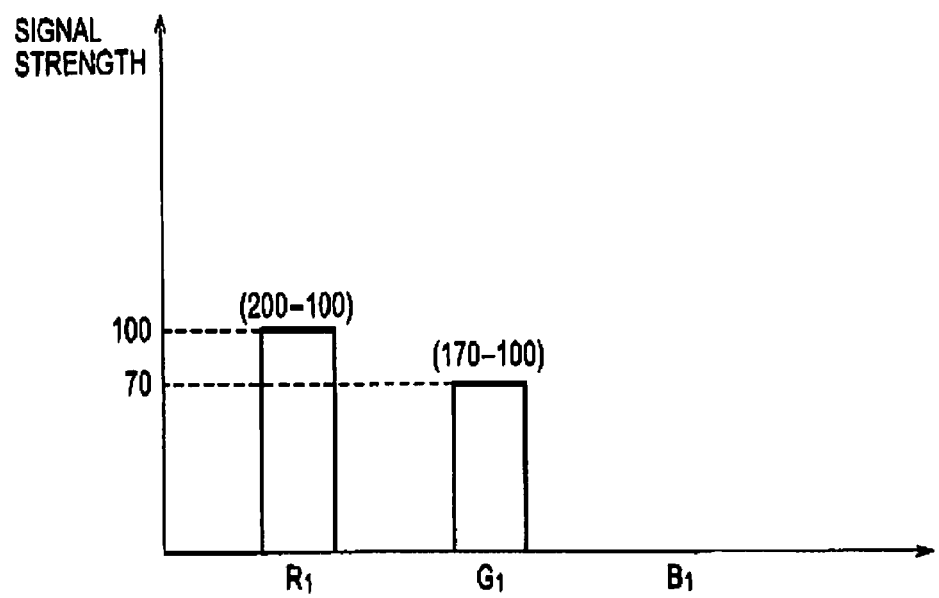
FIG. 11 is a diagram for describing a calculation example of an output signal according the second embodiment.

As shown in FIG. 11, the projection type image display device 100 calculates the red intermediate signal $R_1$ and the green intermediate signal $G_1$ in accordance with the following (Formula 6) to (Formula 8).
[Equation 16]

$$R_1 = R_{in} - W_2 \quad \text{(Formula 6)}$$

$$G_1 = G_{in} - W_2 \quad \text{(Formula 7)}$$

$$B_1 = B_{in} - W_2 \quad \text{(Formula 8)}$$

Figure 12:
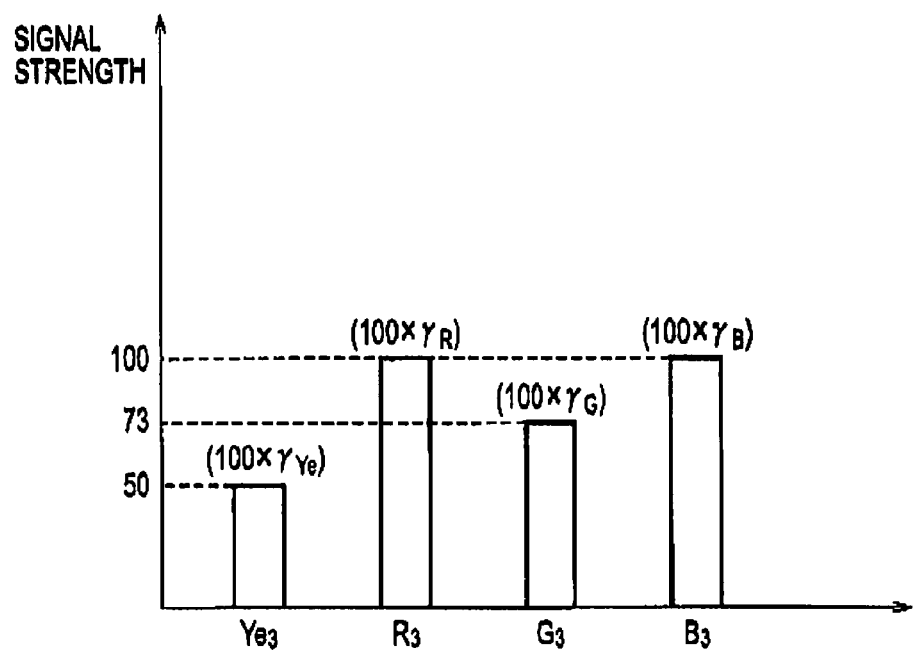
FIG. 12 is a diagram for describing a calculation example of an output signal according the second embodiment.

As shown in FIG. 12, the projection type image display device 100 calculates the red intermediate signal $R_3$, the green intermediate signal $G_3$, the blue intermediate signal $B_3$ and the yellow intermediate signal $Ye_3$ in accordance with the following (Formula 9) to (Formula 12).
[Equation 17]

$$R_3 = W_2 \times r_R \quad \text{(Formula 9)}$$

$$G_3 = W_2 \times r_G \quad \text{(Formula 10)}$$

$$B_3 = W_2 \times r_B \quad \text{(Formula 11)}$$

$$Ye_3 = W_2 \times r_{Ye} \quad \text{(Formula 12)}$$

It should be noted that FIG. 12 exemplifies a case where the ratio for red, $r_R$=187/255, the ratio for green, $r_G$=255/255, the ratio for blue, $r_B$=128/255, and the ratio for yellow, $r_{Ye}$=255/255.

Figure 13:
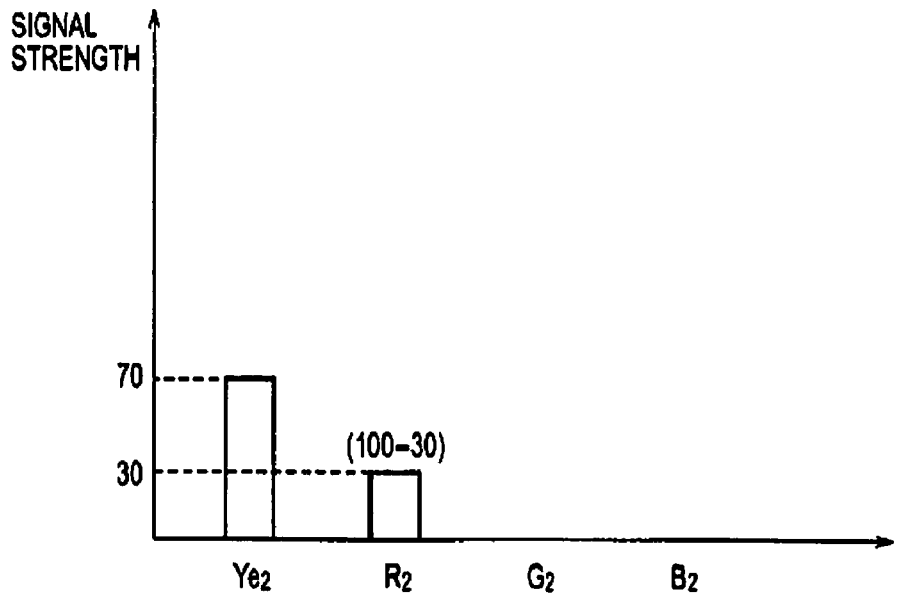
FIG. 13 is a diagram for describing a calculation example of an output signal according the second embodiment.

As shown in FIG. 13, the projection type image display device 100 calculates the Ye replacement signal W on the basis of the red intermediate signal $R_1$ and the green intermediate signal $G_1$ in accordance with the following (Formula 13).
[Equation 18]

$$W_2 = \min(R_1, G_1) \quad \text{(Formula 13)}$$

Subsequently, the projection type image display device 100 calculates the red adjustment signal $R_2$, the green adjustment signal $G_2$ and the yellow adjustment signal $Ye_2$ in accordance with the following (Formula 14) to (Formula 16).
[Equation 19]

$$R_2 = R_1 - W \times \alpha \quad \text{(Formula 14)}$$

$$G_2 = G_1 - W \times \alpha \quad \text{(Formula 15)}$$

$$Ye_2 = W \times (\alpha + \beta_1) \quad \text{(Formula 16)}$$

It should be noted that FIG. 13 exemplifies a case where "1" is specified as the color reproduction parameter α, and "0" is specified as the luminance parameter $B_1$.

Figure 14:
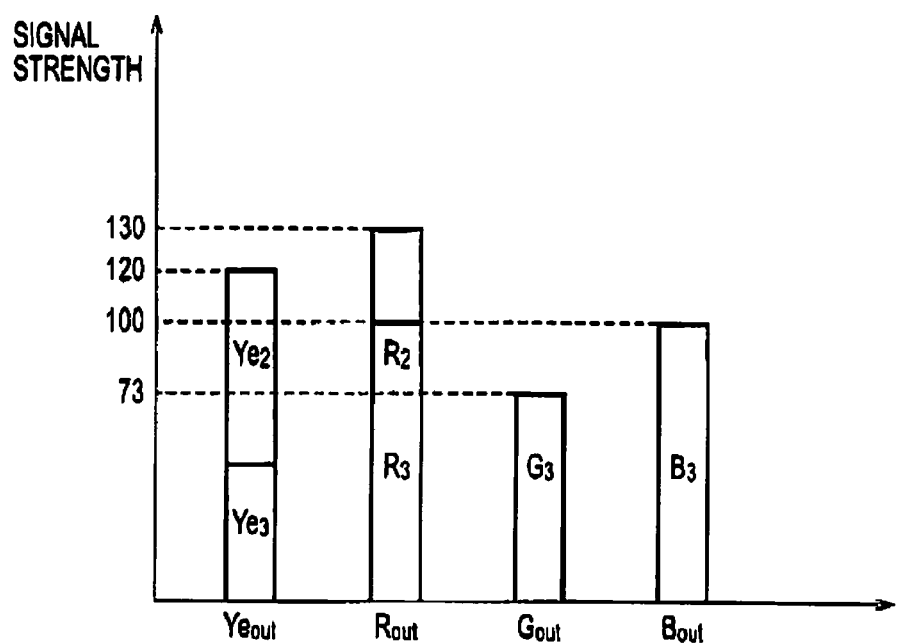
FIG. 14 is a diagram for describing a calculation example of an output signal according the second embodiment.

As shown in FIG. 14, the projection type image display device 100 outputs a signal obtained by combining the red adjustment signal $R_2$ and the red intermediate signal $R_3$, to the liquid crystal panel 30R as a red output signal $R_{out}$. Likewise, the projection type image display device 100 outputs a signal obtained by combining the green adjustment signal $G_2$ and the green intermediate signal $G_3$, to the liquid crystal panel 30G as a green output signal $G_{out}$. Moreover, the projection type image display device 100 outputs a signal obtained by combining the yellow adjustment signal $Ye_2$ and the yellow intermediate signal $Ye_3$, to the liquid crystal panel 30Ye as a yellow output signal $Ye_{out}$. In the meantime, the projection type image display device 100 outputs the blue intermediate signal $B_3$ as a blue output signal $B_{out}$, to the liquid crystal panel 30B.

Effects and Advantages

According to the projection type image display device 100 of the second embodiment, the controller 130 extracts the signal strength common component $W_2$ having a signal strength common to the red input signal $R_{in}$, to the green input signal $G_{in}$ and to the blue input signal $B_{in}$ and then multiplies the signal strength common component $W_3$ by the ratio in which the luminosity factors are taken into consideration. Thereby, the controller 130 calculates the red intermediate signal $R_3$, the green intermediate signal $G_3$, the blue intermediate signal $B_3$ and the yellow intermediate signal $Ye_3$.

Furthermore, the controller 130 calculates the red adjustment signal $R_2$, the green adjustment signal $G_2$ and the yellow adjustment signal $Ye_3$ on the basis of the intermediate signal $R_1$ and the intermediate signal $G_1$ that are obtained by excluding the signal strength common component $W_2$ from the red input signal $R_{in}$ and the green input signal $G_{in}$, respectively.

Moreover, the red output signal $R_{out}$ is obtained by combining the red adjustment signal $R_2$ and the red intermediate signal $R_3$. The green output signal $G_{out}$ is obtained by combining the green intermediate signal $G_3$ and the green adjustment signal $G_2$. The yellow output signal $Ye_{out}$ is obtained by combining the yellow intermediate signal $Ye_3$ and the yellow adjustment signal $Ye_2$.

More specifically, by excluding the signal strength common component $W_2$ from the red input signal 111 and the green input signal $G_{in}$, it is possible to prevent an occurrence of disruption of color balance caused by mixing the yellow light component Ye and the blue light component B.

Third Embodiment

Hereinafter, a description will be given of a third embodiment with reference to the drawings. The description below will be mainly given of differences between the aforementioned first embodiment and the third embodiment.

Specifically, in the case of the aforementioned first embodiment, the controller 130 calculates the yellow output signal $Ye_{out}$ in accordance with the color saturation or the luminance of the image. On the other hand, in the third embodiment, on the basis of the correlation (high-frequency component) between a target region to be controlled and an adjacent region adjacent to the target region, the controller 130 calculates the yellow output signal $Ye_{out}$ corresponding to the target region.

It should be noted that the target region may be a pixel unit or a block unit.

Functions of Projection Type Image Display Device

Hereinafter, a description will be given of functions of the projection type image display device according to the third embodiment with reference to the drawings. It should be noted that the blocks respectively showing the functions of the controller 130 are the same as those in the case of the first embodiment (refer to FIG. 4).

Figure 15:
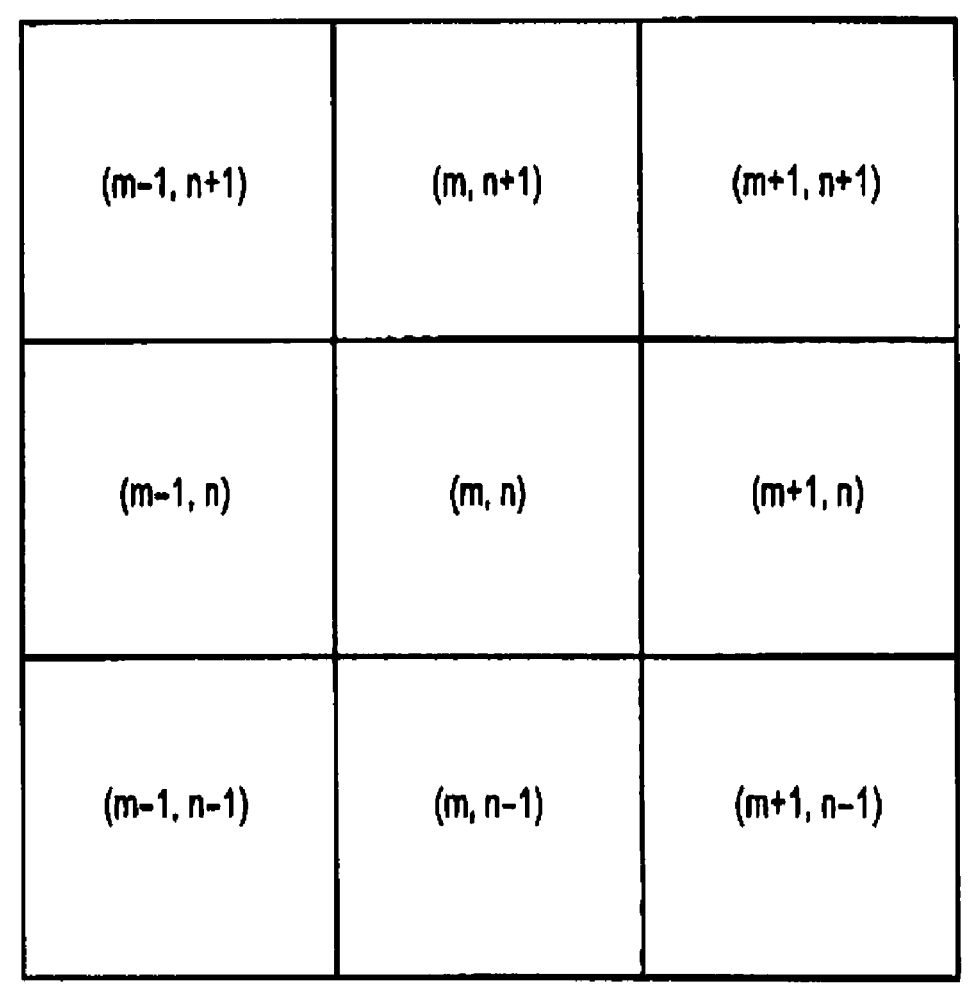

As shown in FIG. 15, a description will be given of a case where the coordinate in the horizontal direction of the target region is assumed to be "m," and the coordinate in the vertical direction of the target region is assumed to be "n." The adjacent regions adjacent to the target region are the following eight regions; (m−1, n+1), (m, n+1), (m+1, n+1), (m−1, n), (m+1, n), (m−1, n−1), (m, n−1) and (m+1, n−1).

The Ye replacement component calculator 132 calculates the correlations between the target region and the adjacent regions with respect to the horizontal direction, the perpendicular direction and the orthogonal directions. Specifically, the Ye replacement component calculator 132 calculates the correlations in accordance with the following (Formula 17) to (Formula 20).
[Equation 20]

$$HPF\_H = -P[m-1,n] + 2P[m,n] - P[m+1,n] \quad \text{(Formula 17)}$$

$$HPF\_V = -P[m,n+1] + 2P[m,n] - P[m,n-1] \quad \text{(Formula 18)}$$

$$HPF\_D1 = -P[m-1,n+1] + 2P[m,n] - P[m+1,n-1] \quad \text{(Formula 19)}$$

$$HPF\_D2 = -P[m+1,n+1] + 2P[m,n] - P[m-1,n-1] \quad \text{(Formula 20)}$$

Provided that the image input signals of [m−1, n+1] is (m−1, n+1), [m,n+1] is (m,n+1), [m−1,n+1] is (m−1,n+1), [m−1,n] is (m−1,n), [m,n] is (m,n), [m+1,n] is (m+1,n), [m−1,n−1] is (m−1,n−1), [m,n−1] is (m,n−1), and [m+1,n−1] is (m+1,n−1).

Subsequently, the Ye replacement component calculator 132 calculates the Ye replacement signal Wa in accordance with the following (Formula 21).
[Equation 21]

$$W_a = \min(R_{in}, G_{in}) + \min(HPF\_H, HPF\_V, HPF\_D1, HPF\_D2) \times C1 \quad \text{(Formula 21)}$$

Provided that, min(HPF_H, HPF_V, HPF_D1, HPF_D2) is the minimum value of the correlation in each of the directions, and C1 is a Ye component superimposed coefficient (C1≧0).

Here, it should be noted that the Ye component superimposed coefficient (C1) is set so that the higher the luminance of the target region is, the larger the value becomes. Specifically, the higher the luminance of the target region is, the larger the Ye replacement signal Wa becomes.

The Ye component adjustment unit 184 calculates the subtraction amounts Wb of the red input signal $R_{in}$ and of the green input signal $G_{in}$ (reference signals), respectively in accordance with the following (Formula 22).
[Equation 22]

$$W_b = \min(R_{in}, G_{in}) - \min(HPF\_H, HPF\_V, VHPF\_D1, HPF\_D2) \times C2 \quad \text{(Formula 22)}$$

Provided that, min(HPF_H, HPF_V, HPF_D1, HPF_D2) is the minimum value of the correlation in each of the directions, and C2 is a subtraction coefficient (C2≧0).

Here, it should be noted that the subtraction coefficient (C2) is set so that the higher the luminance of the target region is, the larger the value becomes. Specifically, the higher the luminance of the target region is, the less the current remaining amount Wb becomes.

Subsequently, the Ye component adjustment unit 134 calculates the red adjustment signal R', the green adjustment signal G' and the yellow adjustment signal Ye' in accordance with the following (Formula 23) to (Formula 25).
[Equation 23]

$$R' = R_{in} - W_b \times \alpha \quad \text{(Formula 23)}$$

$$G' = G_{in} - W_b \times \alpha \quad \text{(Formula 24)}$$

$$Ye' = W_a \times (\alpha + \beta_1) \quad \text{(Formula 25)}$$

Furthermore, the output unit 135 outputs the red adjustment signal R' as a red output signal $R_{out}$ to the liquid crystal panel 30R. Likewise, the output unit 135 outputs the green adjustment signal G' as the green output signal $G_{out}$ and the yellow adjustment signal Ye' as a yellow output signal $Ye_{out}$ to the liquid crystal panels 30G and 30Ye, respectively. In the meantime, the output unit 135 outputs the blue input signal $B_{in}$ as the blue output signal $B_{out}$ as it is, to the liquid crystal panel 30B.

Here, when the correlations (HPF_H, HPF_V, HPF_D1 and HPF_D2) between the target region and the adjacent regions exceed a predetermined threshold value, the Ye replacement component calculator 132 and the Ye component adjustment unit 134 determine that an edge is provided between the target region and the adjacent regions. Moreover, as mentioned previously, the higher the luminance of the target region is, the larger the Ye replacement signal Wa becomes, and the les the current remaining amount Wb becomes.

Figure 16A:
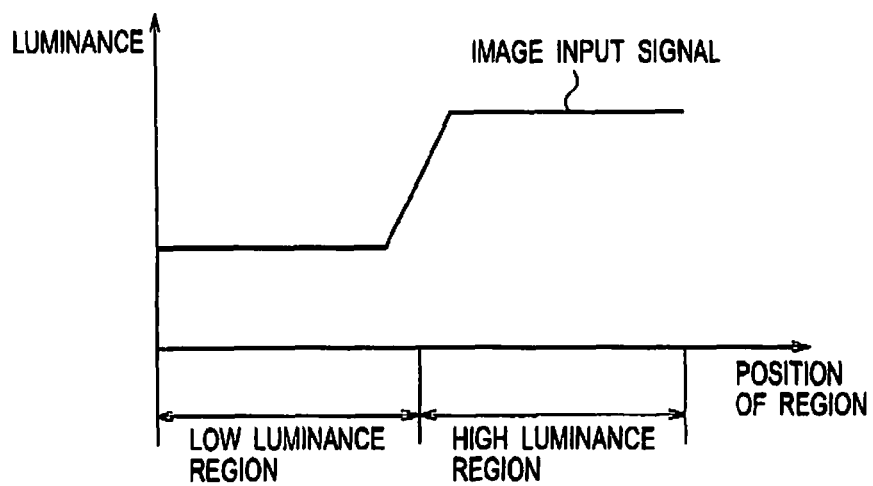
FIGS. 16A to 16C are diagrams each provided for describing a calculation example of an output signal according the third embodiment.
Figure 16B:
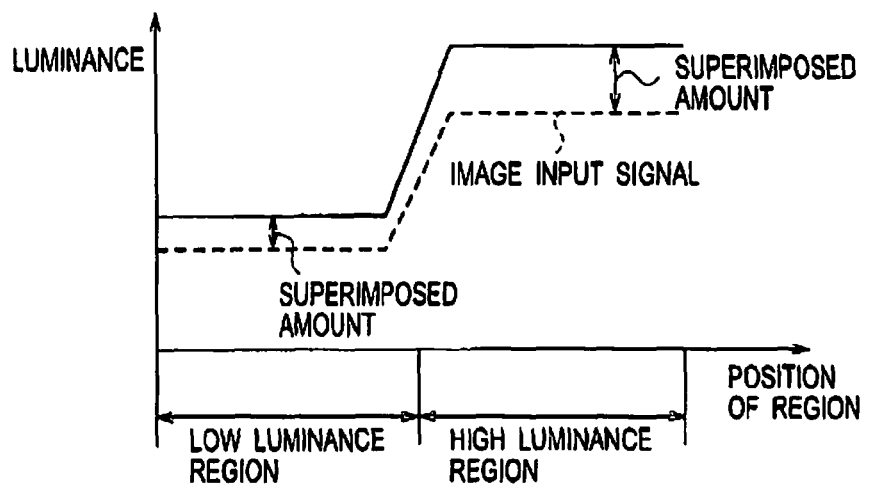

Accordingly, in a case where the image input signal is a signal shown in FIG. 16A, the superimposed amount of the yellow light component Ye is large in the high luminance region as shown in FIG. 16B. On the other hand, the superimposed amount of the yellow light component Ye is small in the low luminance region.

Figure 16C:
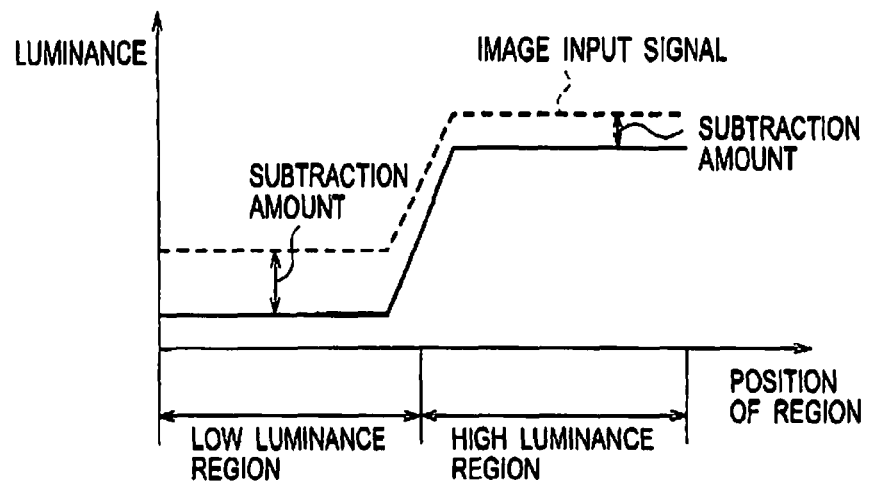

Moreover, as shown in FIG. 16C, the subtraction amounts of the red light component R and the green light component G are small in the high luminance region. On the other hand, the subtraction amounts of the red light component R and the green light component G are large in the low luminance region.

As a result of this, when combining FIG. 16B and FIG. 16C, the luminance further increases in the high luminance region and the luminance further decreases in the low luminance region as shown in FIG. 17. In other words, the edge is emphasized.

Fourth Embodiment

Hereinafter, a description will be given of a fourth embodiment with reference to the drawings. The description below will be mainly given of differences between the aforementioned first embodiment and the fourth embodiment.

Specifically, although it is not particularly mentioned in the aforementioned first embodiment, in the fourth embodiment, in the foreground region and the background region, the superimposed amount of the yellow light component Ye in a region where the motion vector is small is greater than the superimposed amount of the yellow light component Ye in a region where the motion vector is large.

Functions of Projection Type Image Display Device

Figure 18:
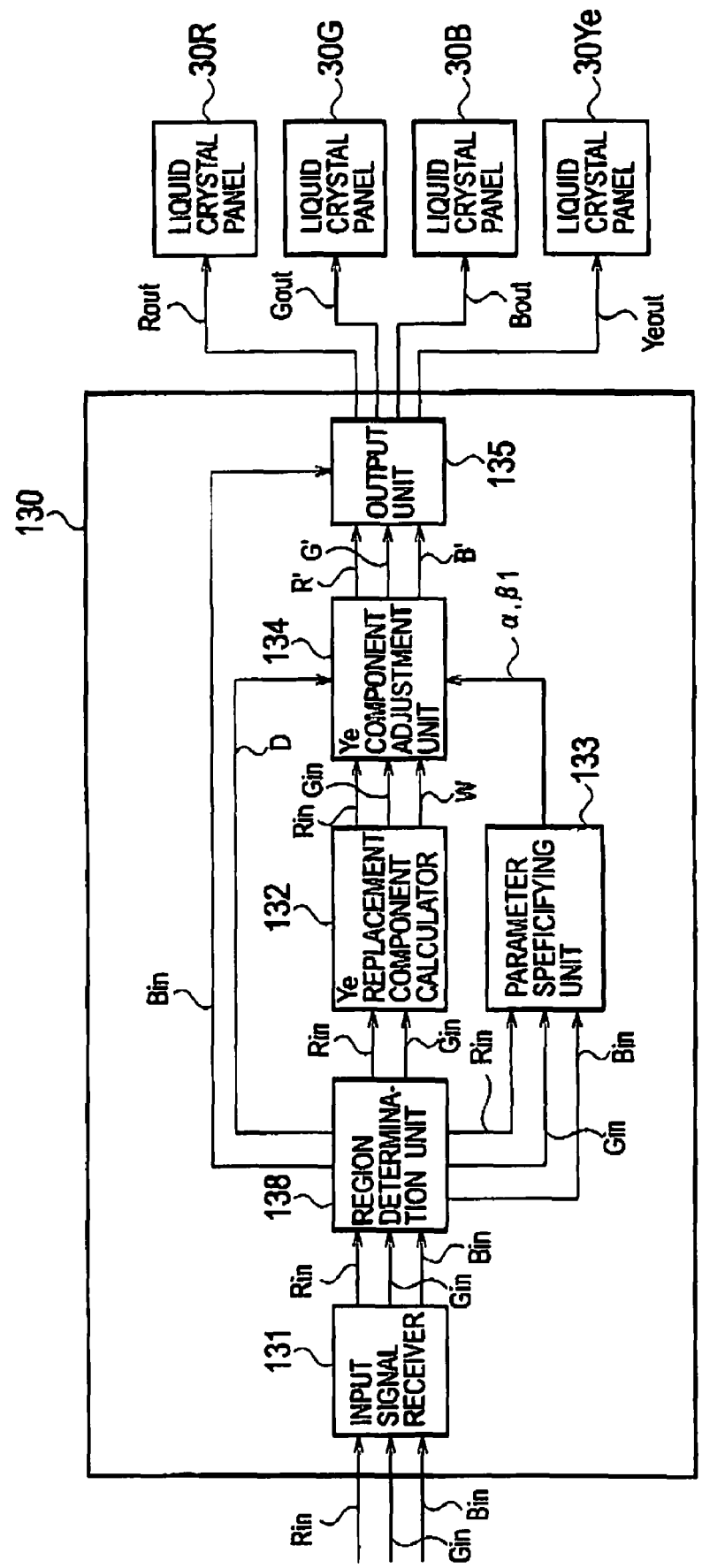
FIG. 18 is a block diagram showing a configuration of a controller 130 according to a fourth embodiment.

Hereinafter, a description will be given of functions of the projection type image display device according to the fourth embodiment with reference to the drawings. FIG. 18 is a block diagram showing the functions of the projection type image display device (controller 130) according to the fourth embodiment. It should be noted that in FIG. 18 the same reference numerals as those in FIG. 4 are assigned to the components that are the same as those in FIG. 4.

As shown in FIG. 18, the controller 180 includes a region determination unit 138 in addition to the components shown in FIG. 4.

The region determination unit 138 is configured to determine a foreground region and a background region in a control target frame that is to be controlled. Specifically, the region determination unit 138 determines the foreground region and the background region in accordance with the difference between the control target frame and a reference frame. It should be noted that reference frames are frames provided at the front and back of the control target frame in the time axis.

Subsequently, the region determination unit 138 detects the motion vectors of the foreground region and the background region by using an existing method such as a block matching. In accordance with the motion vectors of the foreground region and the background region, the region determination unit 138 outputs region control signals (D) corresponding to the foreground region and the background region, to the Ye component adjustment unit 134.

Here, it should be noted that among the foreground region and the background region, the region control signal (D) corresponding to the region where the motion vector is small, is larger than the region control signal (D) corresponding to the region where the motion vector is large.

The Ye component adjustment unit 134 calculates the red adjustment signal R', the green adjustment signal G' and the yellow adjustment signal Ye' in consideration of the region control signals (D). Specifically, the Ye component adjustment unit 134 calculates the red adjustment signal R', the green adjustment signal G' and the yellow adjustment signal Ye' in accordance with the following (Formula 26) to (Formula 28).

[Equation 24]

$$R' = P_{in} - W \times \alpha \times (1-D) \quad \text{(Formula 26)}$$

$$G' = G_{in} - W \times \alpha \times (1-D) \quad \text{(Formula 27)}$$

$$Ye' = W \times (\alpha + \beta_1) \times D \quad \text{(Formula 28)}$$

Provided that $0 \leq D \leq 1$.

As described above, among the foreground region and the background region, the light amount of the yellow light component Ye in the region where the motion vector is small is larger than the light amount of the yellow light component Ye in the region where the motion vector is large.

Accordingly, in a pan image in which the motion vector of the foreground region is smaller than that of the background region, the luminance of the foreground region is more emphasized than the luminance of the background region. Thereby, the foreground region in which the motion vector is small is clearly displayed in this case. On the other hand, in a fixed point imaging video in which the motion vector of the background region is smaller than that of the foreground region, the luminance of the background region is more emphasized than the luminance of the foreground region. Thereby, flickering or the like of the foreground region in which the motion vector is large is suppressed.

Fifth Embodiment

Hereinafter, a description will be given of a fifth embodiment with reference to the drawings. The description below will be mainly given of differences between the aforementioned first embodiment and the fifth embodiment.

In the aforementioned first embodiment, the yellow light component Ye output from the liquid crystal panel (liquid panel 30Ye) is guided to the projection lens without being irradiated by other liquid crystal panels. On the other hand, in the fifth embodiment, the yellow light component Ye output from the liquid crystal panel is first irradiated by other liquid crystal panels and is thereafter guided to the projection lens.

Overall Configuration of Illumination Unit

Figure 19:
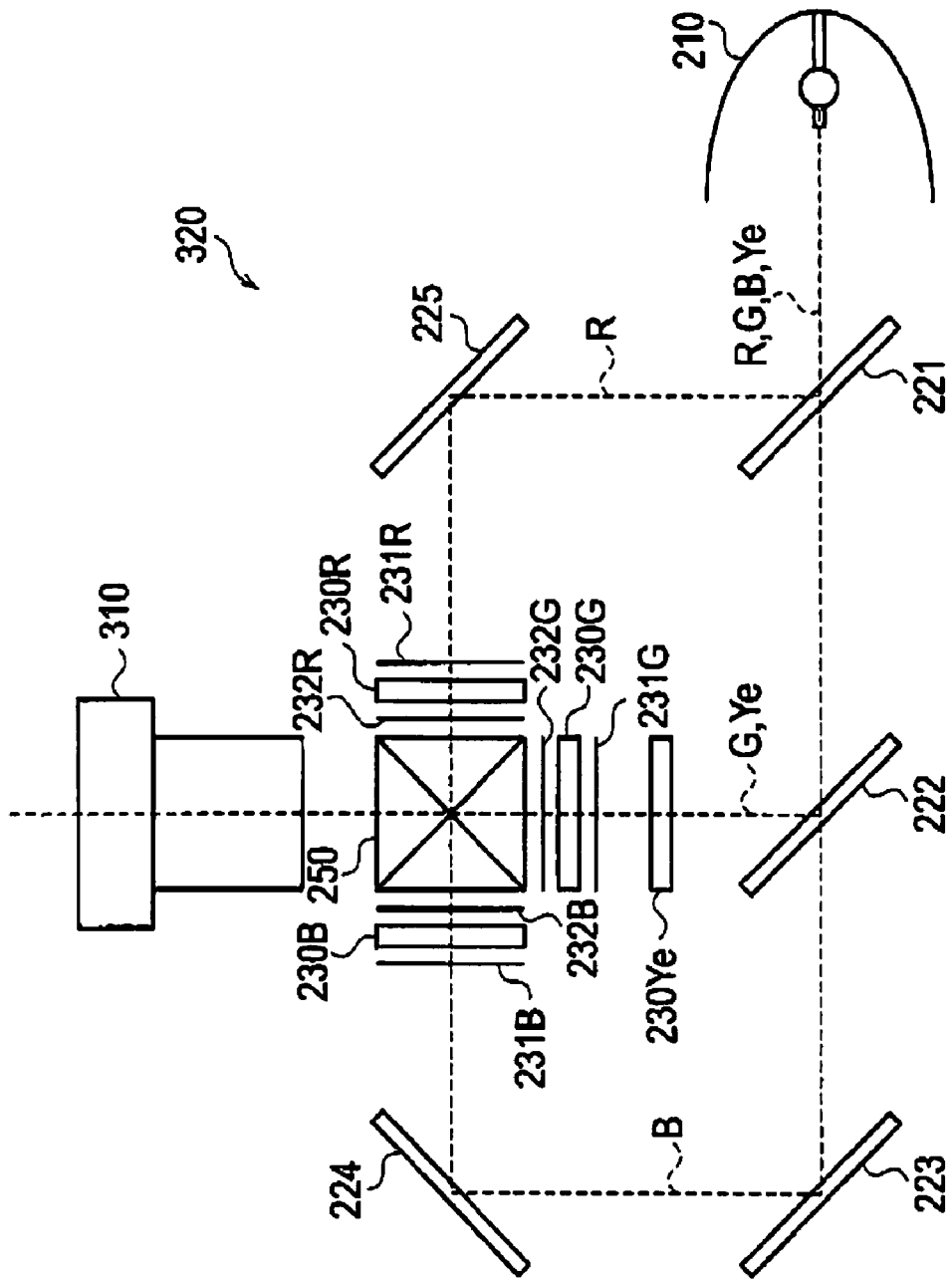
FIG. 19 is a diagram showing a configuration of an illumination unit 320 according to a fifth embodiment.

Hereinafter, a description will be given of an overall configuration of an illumination unit according to the fifth embodiment with reference to the drawings. FIG. 19 is a diagram showing the overall configuration of an illumination unit 320 according to the fifth embodiment. It should be noted that a fly eye lens, which uniforms light emitted from a light source 210, a polarized beam splitter (PBS), which aligns the polarization directions of light emitted from the light source 210 into a certain polarization direction (for example, a P polarization direction) and the like are omitted in FIG. 19.

As shown in FIG. 19, the illumination unit 320 includes the light source 210, a plurality of liquid crystal panels (liquid crystal panels 230R, 230G and 230B), a polarization switching element 230Ye and a cross-dichroic cube 250. It should be noted that although a projection lens unit 310 is shown in FIG. 19, the projection lens unit 310 is not included in the illumination unit 820.

The light source 210 is a UHP lamp or the like, which emits a white light. Specifically, the light emitted from the light source 210 includes at least a red light component, a green light component, a blue light component and a yellow light component.

The liquid crystal panel 230R modulates the red light component by rotating the polarization direction of the red light component. A polarizing plate 231R is provided to the light incident side of the liquid crystal panel 230R. The polarizer 231R allows a light having a certain polarization direction (for example, a P polarization) to transmit therethrough, and blocks a light having a different polarization direction (for example, an S polarization). On the other hand, a polarizing plate 232R is provided to the light output side of the liquid crystal panel 230R. The polarizing plate 232R allows the light having the different polarization direction for example, the S polarization) to transmit therethrough, and blocks the light having the certain polarization direction (for example, the P polarization).

Accordingly, in a case where the liquid crystal panel 230R does not rotate the polarization direction of the red light component, the red light component is not irradiated by the cross-dichroic cube 250 since the red light component having transmitted through the polarizing plate 231R is blocked by the polarizing plate 232R. On the other hand, in a case where the liquid crystal panel 230R rotates the polarization direction of the red light component, the red light component is irradiated by the cross-dichroic cube 250 since the red light component having transmitted through the polarizing plate 231R also transmits through the polarizing plate 232R.

Likewise, the liquid crystal panel 230G modulates the green light component and the yellow light component by rotating the polarization directions of the green light component and the yellow light component, respectively. A polarizing plate 231G is provided to the light incident side of the liquid crystal panel 230G. The polarizing plate 231G allows a light having a certain polarization direction to transmit therethrough, and blocks a light having a different polarization direction. On the other hand, a polarizing plate 232G is provided to light output side of the liquid crystal panel 230G. The polarizing plate 232G allows the light having the different polarization direction to transmit therethrough, and blocks the light having the certain polarization direction.

The liquid crystal panel 230B modulates the blue light component by rotating the polarization direction of the blue light component. A polarizing plate 231B is provided to the light incident side of the liquid crystal panel 230B. The polarizing plate 231B allows a light having a certain polarization direction, and blocks a light having a different polarization direction. On the other hand, a polarizing plate 282B is provided to the light output side of the liquid crystal panel 230B. The polarizing plate 232B allows the light having the different polarization direction to transmit therethrough, and blocks the light having the certain polarization direction.

The polarization switching element 230Ye modulates the yellow light component by rotating the polarization direction of the yellow light component. In the meantime, the polarization switching element 230Ye allows the green light component to transmit therethrough without rotating the polarization direction of the green light component.

It should be noted that in this embodiment, the polarization switching element 230Ye is an element that selectively switches to rotate the polarization direction of the yellow light component by 90°, or not to rotate the polarization direction of the yellow light component within the range of 0 to 90°. Furthermore, it should be noted that the polarization switching element 230Ye does not include a configuration to switch the polarization direction of the yellow light component for each of a plurality of divided regions (for example, pixels). It should be also noted that the polarization switching element 230Ye is an element that rotates all the yellow light components entered into the polarization switching element 230Ye.

Figure 20A:
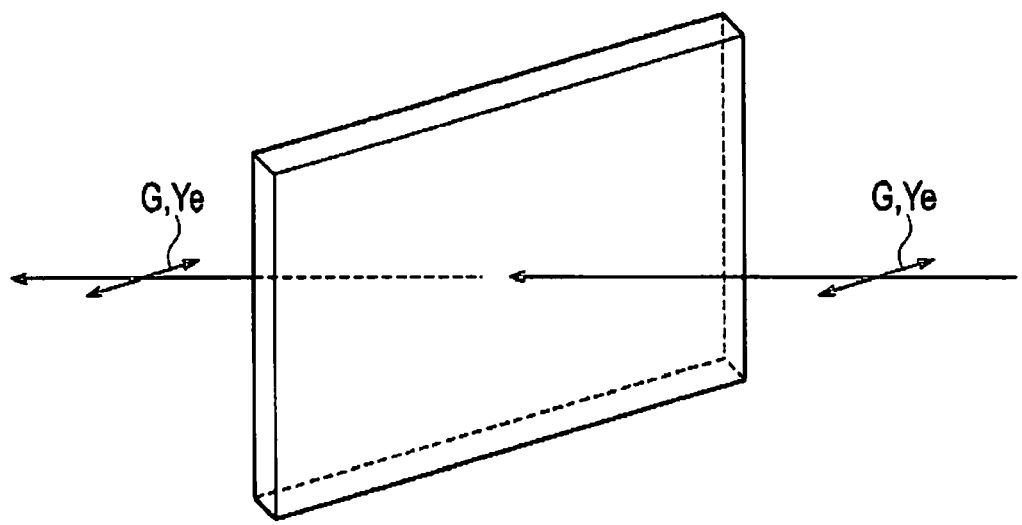
FIG. 20A and 20B are diagrams each showing a liquid crystal panel 30Ye according to the fifth embodiment.

For example, as shown in FIG. 20A, the polarization switching element 280Ye allows the green light component and the yellow light component to transmit therethrough without rotating the polarization directions of the green light component and the yellow light component when the polarization switching element 230Ye is in a state where a voltage is not applied to the polarization switching element 230Ye (power OFF).

Figure 20B:
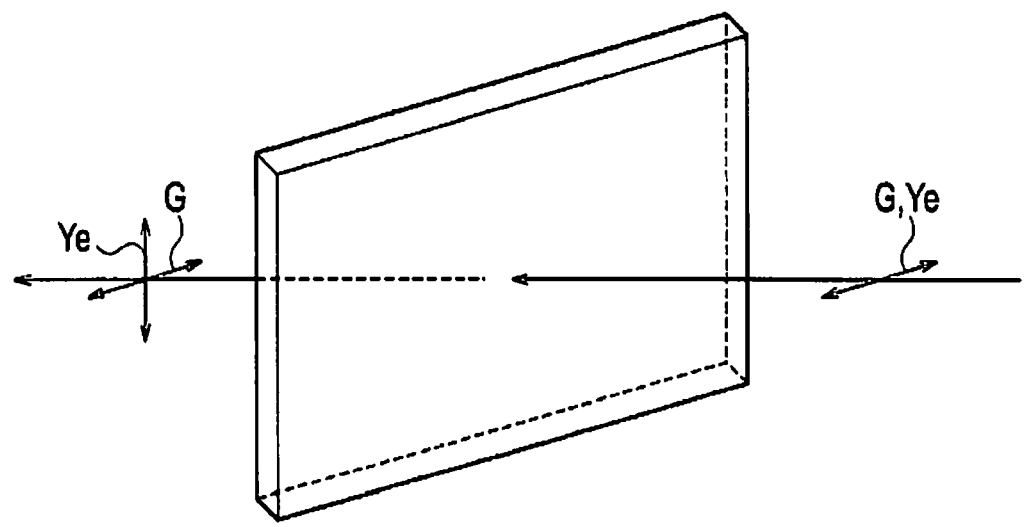

On the other hand, as shown in FIG. 20B, the polarization switching element 280Ye allows the green light component and the yellow light component to transmit therethrough by rotating only the polarization direction of the yellow light component by 90° when the polarization switching element 230Ye is in a state where a voltage is applied to the polarization switching element 230Ye (power ON).

Here, the yellow light component and the green light component, which are outputted from the polarization switching element 230Ye, are irradiated by the polarizing plate 231G. The polarizing plate 231G allows a light having a certain polarization direction (for example, the S polarization) to transmit therethrough, and blocks a light having a different polarization direction (for example, the P polarization). Accordingly, the light amount of the yellow light component that reaches to the cross-dichroic cube 250 is controlled depending on whether or not the polarization switching element 230Ye rotates the polarization direction of the yellow light component.

The cross-dichroic cube 250 combines lights output from the liquid crystal panels 230R, 230G and 230B. Specifically, the cross-dichroic cube 250 combines the red light component output from the liquid crystal panel 230R, the green light component and the yellow light component, which are outputted from the liquid crystal panel 230G, and the blue light component output from the liquid crystal panel 230B. Moreover, the cross-dichroic cube 250 outputs the combined light (image light) including the red light component, the green light component, the blue light component and the yellow light component towards the projection lens unit 310.

As described above, the projection lens unit 310 projects, on the screen 200, the combined light (image light) combined by the cross-dichroic cube 250.

The illumination unit 320 includes a plurality of mirrors (mirrors 221 to 225). The mirror 221 is a dichroic mirror that allows the blue light component, the green light component and the yellow light component to transmit therethrough, and that reflects the red light component. The mirror 222 is a dichroic mirror that reflects the green light component and the yellow light component, and that allows the blue light component to transmit therethrough. The mirrors 223 and 224 are mirrors each reflects the blue light component and then guides the blue light component towards the liquid crystal panel 230B. The mirror 225 is a mirror that reflects the red light component and then guides the red light component towards the liquid crystal panel 230R.

Functions of Fourth Color Light valve

Hereinafter, a description will be given of functions of a fourth color light valve according to the fifth embodiment with reference to the drawings. FIG. 21 is a diagram provided for describing the functions of the fourth color light valve (polarization switching element 230Ye) according to the fifth embodiment.

Specifically, combinations of the polarization switching element 230Ye and the polarizing plate 231G are shown in FIG. 21. A polarization switching element Ye-1 is an element that rotates only the polarization direction of the yellow light component by 90° in a state where a voltage is applied (power ON). On the other hand, a polarization switching element Ye-2 is an element that rotates only the polarization direction of the yellow light component by 90° in a state where a voltage is not applied (power OFF).

A polarizing plate G-1 is an element that allows a light having the P polarization to transmit therethrough, and that blocks a light having the S polarization. The polarizing plate G-1 is used in a case where a light emitted from the light source 210 is to be aligned with the P polarization. On the other hand, the polarizing plate G-2 is an element that allows a light having the S polarization to transmit therethrough, and that blocks light having the P polarization. The polarizing plate G-2 is used in a case where a light emitted from the light source 210 is to be aligned with the S polarization, for example.

As shown in FIG. 21, in a case where the polarization switching element Ye-1 is used in when a light emitted from the light source 210 is to be aligned with the P polarization, the light amount of the yellow light component that reaches the cross-dichroic cube 250 becomes the maximum in the state where a voltage is not applied to the polarization switching element Ye-1 (power OFF). On the other hand, in a case where the polarization switching element Ye-2 is used, the light amount of the yellow light component that reaches the cross-dichroic cube 250 becomes the maximum in the state where a voltage is applied to the polarization switching element Ye-2 (power ON).

Next, in a case where the polarization switching element Y-1 is used when the light emitted from the light source 210 is to be aligned with the S polarization, the light amount of the yellow light component that reaches the cross-dichroic cube 250 becomes the maximum in the state where a voltage is not applied to the polarization switching element Ye-1 (power OFF). On the other hand, in a case where the polarization switching element Ye-2 is used, the light amount of the yellow light component that reaches the cross-dichroic cube 250 becomes the maximum in the state where a voltage is applied to the polarization switching element Ye-2 (power ON).

Functions of Projection Type Image Display Device

Hereinafter, a description will be given of functions of the projection type image display device according to the fifth embodiment with reference to the drawings. It should be noted that the blocks respectively showing the functions of the controller 130 are the same as those in the case of the first embodiment (refer to FIG. 4).

Figure 22:
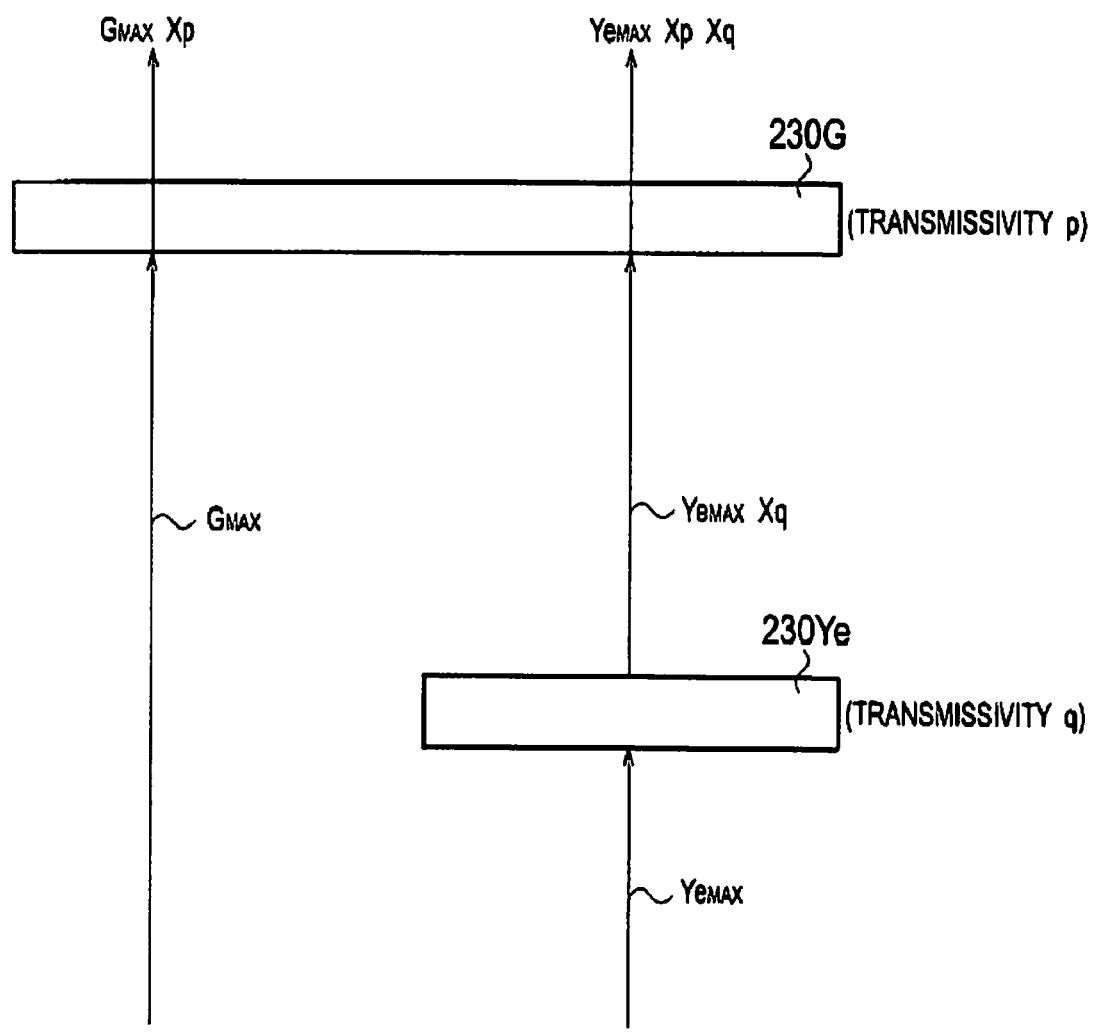
FIG. 22 is a diagram for describing a transmissivity of a liquid crystal panel 230G according to the fifth embodiment.

Here, in the fifth embodiment, the yellow light component output from the polarization switching element 230Ye is irradiated by the liquid crystal panel 230G as shown in FIG. 22. Accordingly, for calculating the yellow light component, not only the transmissivity (q) of the polarization switching element 230Ye, but also the transmissivity (p) of the liquid crystal panel 230G needs to be considered. It should be noted that the transmissivity (p) is controlled by the aforementioned green output signal $G_{out}$. Likewise, it should be noted that the transmissivity (q) is controlled by the aforementioned yellow output signal $Ye_{out}$.

In a case where the green light component G emitted from the light source 210 is set to be $G_{MAX}$, the light amount of the green light component G output from the liquid crystal panel 230G is expressed by "$G_{MAX} \times p$." On the other hand, in a case where the yellow light component Ye emitted from the light source 210 is set to be $Ye_{MAX}$, the light amount of the yellow light component Ye output from the polarization switching element 230Ye is expressed by "$Ye_{MAX} \times q$." Accordingly, the light amount of the yellow component light Ye output from the liquid crystal panel G is expressed by "$Ye_{MAX} \times p \times q$."

Here, a description will be given for a case where the yellow light component Ye is to be superimposed over the green light component G. In this case, the light amount ("$G_{MAX} \times p$") of the green light component output from the liquid crystal panel 230G is obtained by subtracting the light amount ("$Ye_{MAX} \times p \times q$") of the yellow light component from the light amount (IN) corresponding to the green input signal $G_{in}$.

Here, in a case where the light amount subtracted from the light amount corresponding to the green input signal $G_{in}$ is expressed by "X," the transmissivity p) of the liquid crystal panel 230G, that is, the green output signal $G_{out}$ is calculated in accordance with the following (Formula 29) to (Formula 31).

[Equation 25]

$$G_{Max} \times p = IN - X \quad \text{(Formula 29)}$$

$$Ye_{MAX} \times p \times q = X \quad \text{(Formula 30)}$$

$$p = IN / \{G_{MAX} + Ye_{MAX} \times q\} \quad \text{(Formula 31)}$$

As described above, the green output signal $G_{out}$ is controlled by using the light amount (X), which is subtracted from the light amount corresponding to the green input signal $G_{in}$ as the basis.

Sixth Embodiment

Hereinafter, a description will be given of a sixth embodiment with reference to the drawings. The description below will be mainly given of differences between the aforementioned first embodiment and the sixth embodiment.

Specifically, although it is not particularly mentioned in the aforementioned first embodiment, the Ye replacement signal W is calculated for each control target region which enables to control the light amount of the yellow light component Ye (that is, the yellow output signal $Ye_{out}$). The control target region is determined in accordance with the resolution of the liquid crystal panel 30Ye. The control target region may be the entire image display surface (frame) of the liquid crystal panel 30Ye or a plurality of divided regions pixels or blocks) provided in the liquid crystal panel 30Ye.

On the other hand, image input signals (red input signal $R_{in}$, green input signal $G_{in}$ and blue input signal $B_{in}$) are signals for controlling each pixel provided in the liquid crystal panels 30. Accordingly, in the calculation of the Ye replacement signal W, such as the total value, the average value or the like of the image input signals corresponding to the control target region is used.

Moreover, as in the case of the image input signals, image output signals (red output signal $R_{out}$, green output signal $G_{out}$ and blue output signal $B_{out}$) are signals for controlling each pixel provided in the liquid crystal panels 30.

In the sixth embodiment, a description will be provided for a case where the control target region (a frame or block) of the yellow output signal $Ye_{out}$ is larger than the control target region (a pixel) of other image input signals (red output signal $R_{out}$, green output signal $G_{out}$ and blue output signal $B_{out}$). In such cases, there is a case where the influence of the Ye replacement signal W cannot be completely excluded in the calculation of the red output signal $R_{out}$ or the green output signal $G_{out}$.

In the sixth embodiment, disruption of color balance caused by superimposing of the yellow light component Ye is prevented not only by decreasing the red input signal $R_{in}$ or the green input signal $G_{in}$, but also by increasing the blue input signal $B_{in}$.

Functions of Projection Type Image Display Device

Hereinafter a description will be given of functions of a projection type image display device according to the sixth embodiment with reference to the drawings. It should be noted that the blocks respectively showing the functions of the controller 130 are the same as those in the case of the first embodiment (refer to FIG. 4).

Hereinafter, among the pixels included in the control target region, a description will be given for a case where a pixel has a Ye replacement signal W larger than the red input signal $R_{in}$ or the green input signal $G_{in}$. It should be noted that the Ye replacement signal W is a value calculated by the Ye replacement component calculator 132 on the basis of the total value or the average value of the image input signals (red input signal $R_{in}$ or green input signal $G_{in}$) corresponding to the control target region.

It should be noted that as in the case of the first embodiment, the red input signal and the green input signal are signals (reference signals) corresponding to colors different (red color R and green color G) from the complementary color (blue color B) of the yellow color Ye to be reproduced by the yellow component color Ye. The blue input signal $B_{in}$ is a signal corresponding to the complementary color (blue color B) of the yellow color Ye to be reproduced by the yellow light component Ye.

The Ye component adjustment unit 134 calculates first intermediate signals (a red intermediate signal $R_{11}$, a green intermediate signal $G_{11}$ and a blue intermediate signal $B_{11}$) in accordance with the following (Formula 41) to (Formula 43).
[Equation 26]

$$R_{11} = R_{in} - \min(R_{in}, G_{in}) \quad \text{(Formula 41)}$$

$$G_{11} = G_{in} - \min(R_{in}, G_{in}) \quad \text{(Formula 42)}$$

$$B_{11} = B_{in} \quad \text{(Formula 48)}$$

As in the case of the first embodiment, it should be noted that $\min(R_{in}, G_{in})$ is an input signal having a low signal strength among the red input signal $R_{in}$ and the green input signal $G_{in}$. Accordingly, any one of the red intermediate signal $R_{11}$ and the green intermediate signal $G_{11}$ is "0." Moreover, $\min(R_{in}, G_{in})$ is equivalent to the subtraction amount of the red input signal and the green input color (reference signals).

Subsequently, the Ye component adjustment unit 134 calculates second rod intermediate signals (a red intermediate signal $R_{12}$, a green intermediate signal $G_{12}$ and a blue intermediate signal $B_{12}$) in accordance with the following (Formula 44) to (Formula 46).
[Equation 27]

$$R_{12} = R_{11} \quad \text{(Formula 44)}$$

$$G_{12} = G_{12} \quad \text{(Formula 45)}$$

$$B_{12} = B1 + A(W - \min(R_{in}, G_{in})), \text{ provided that } 0 < A \leq 1 \quad \text{(Formula 46)}$$

Here, it should be noted that "$W - \min(R_{in}, G_{in})$" is a value resulting from not completely subtracting the Ye replacement signal W from the red input signal $R_{in}$ or the green input signal $G_{in}$. Specifically, "$W - \min(R_{in}, G_{in})$" is the difference between the yellow output signal $Ye_{out}$ (Ye replacement signal W) and the subtraction amount of the reference signal (red input signal $R_{in}$ and green input signal $G_{in}$). "A" is a coefficient (complementary color light addition coefficient) for adjusting the addition amount of the blue input signal $B_{in}$.

As described above, the Ye component adjustment unit 134 calculates the subtraction amount of the reference signals (red input signal $R_{in}$ and green input signal $G_{in}$) in accordance with the fourth color output signal yellow output signal $Ye_{out}$). Subsequently, in accordance with the difference between the fourth color output signal mellow output signal $Ye_{out}$) and the subtraction amount of the reference signals (red input signal $R_{in}$ and green input signal $G_{in}$), the Ye component adjustment unit 134 calculates an increasing amount of the blue input signal $B_{in}$ corresponding to the complementary color (blue color B) of the color mellow color Ye) reproduced by the fourth color light component mellow light component Ye).

It should be noted that the output unit 135 outputs the red intermediate signal $R_{12}$ as the red output signal $R_{out}$ to the liquid crystal panel 30R. The output unit 135 outputs the green intermediate signal $G_{12}$ as the green output signal $G_{out}$ to the liquid crystal panel 30G. The output unit 135 outputs the blue intermediate signal $B_{13}$ is as the blue output signal $B_{out}$ to the liquid crystal panel 30B. The output unit 135 outputs the replacement signal W as the yellow output signal $Ye_{out}$ to the liquid crystal panel 30Ye.

It should be noted that although it is not particularly mentioned in the sixth embodiment, each of the image output signals can be adjusted by the aforementioned color reproduction parameter $\alpha$, the luminance parameter $\beta_1$, the luminance parameter $\beta_s$ and the like, as a matter of course.

Calculation Example of Image Output Signal

Hereinafter, a description will be given of a calculation example of image output signals according to the sixth embodiment. In the description below, a description will be given for a pixel when the Ye replacement signal W (that is, the yellow output signal $Ye_{out}$) is "80," and the signal values ($R_{in}$, $G_{in}$, $B_{in}$) of the red input signal $R_{in}$, the green input signal $G_{in}$ and the blue input signal $B_{in}$ are (50, 100, 50).

It is assumed that the yellow output signal $Ye_{out}$ is replaceable by ($R_{out}$, $G_{out}$, $B_{out}$)=(80, 80, 0), and the complementary color light addition coefficient A is "1."

First, the first intermediate signals are calculated in accordance with the aforementioned (Formula 41) to (Formula 43).

$$R_{11} = R_{in} - \min(R_{in}, G_{in}) = 50 - 50 = 0$$

$$G_{11} = G_{in} - \min(R_{in}, G_{in}) = 100 - 50 = 50$$

$$B_{11} = B_{in} = 50$$

Next, the second intermediate signals are calculated in accordance with the aforementioned (Formula 44) to (Formula 46).

$$R_{12} = R_{11} = 0$$

$$G_{12} = G_{12} = 50$$

$$B_{12} = B1 + A(W - \min(R_{in}, G_{in})) = 50 + (80 - 50) = 80$$

Specifically, the signal values ($R_{out}$, $G_{out}$, $B_{out}$) of the red output signal $R_{out}$, the green output signal and the blue output signal $B_{out}$ are (0,50,80).

The yellow output signal $Ye_{out}$ is added to the red output signal $R_{out}$, the green output signal $G_{out}$ and the blue output signal $B_{out}$, eventually. Accordingly, the signal values (R,G, B) corresponding to the respective color light components output from the projection type image display device 100 are (80,130,80).

Here, the hues of light reproduced by the red, green and blue signal values are calculated in accordance with the following (Formula 47) to (Formula 49).

[Equation 28]

$$H = 60 \times \frac{G-B}{\text{MAX} - \text{MIN}} + 0 \quad \text{if}(\text{MAX} = R) \quad \text{Formula (47)}$$

$$H = 60 \times \frac{B-R}{\text{MAX} - \text{MIN}} + 120 \quad \text{if}(\text{MAX} = G) \quad \text{(Formula 48)}$$

-continued $$H = 60 \times \frac{R-G}{MAX-MIN} + 240 \quad \text{if}(MAX = B) \qquad \text{(Formula 49)}$$

Provided that MAX=MAX(R,G,B), MIN=MIN(R,G,B).

Here, the hue (H) of the input image signal (50,100,50) is calculated by using (Formula 48). Specifically, the hue (H) of the input image signal (50,100,50) is "120."

Likewise, the hue (H) of the image light (80,130,80) output from the projection type image display device 100 is calculated by using (Formula 48). Specifically the hue (H) of the image light (80,130,80) is "120."

As described so far, not only by decreasing the red input signal $R_{in}$ or the green input signal $G_{in}$, but also by increasing the blue input signal $B_{in}$, the hue of the image light output from the projection type image display device 100 is suppressed from being shifted from the hue of the input image signal.

First Example of Conventional Technique

In a first example of a conventional technique, among the red input signal $R_{in}$ and the green input signal $G_{in}$, the Ye replacement signal W corresponding to the smaller input signal is subtracted from both of the red input signal $R_{in}$ and the green input signal $G_{in}$.

As in the case of the aforementioned "calculation example of the image output signal," a description will be given for a case where a pixel having the signal values ($R_{in}$, $G_{in}$, $B_{in}$) of the red input signal $R_{in}$, the green input signal $G_{in}$ and the blue input signal BID are (50,100,60). It is assumed that the Ye replacement signal W (that is, the yellow output signal $Ye_{out}$) is "80," and is replaceable with ($R_{out}$, $G_{out}$, $B_{out}$)=(80,80,0).

In the first example of the conventional technique, the red output signal $R_{out}$, the green output signal $G_{out}$ and the blue output signal $B_{out}$ are shown as follows.

$R_{out}$=50–50=0

$G_{out}$=100–50=50

$B_{out}$=50

In the first example of the conventional technique, the signal values (R,G,B) corresponding to respective color light components output from the projection type image display device 100 are (80,130,50). The hue (H) of the image light output from the projection type image display device 100 is calculated by using (Formula 48). Specifically, the hue (H) of the image light (80,130,80) is "97.5."

Second Example of Conventional Technique

In a second example of the conventional technique, the Ye replacement signal W is subtracted from both of the red input signal $R_{in}$ and the green input signal $G_{in}$ as much as possible.

As in the case of the aforementioned "calculation example of the image output signal," a description will be given for a case where a pixel having the signal values ($R_{in}$, $G_{in}$, $B_{in}$) of the red input signal $R_{in}$, the green input signal $G_{in}$ and the blue input signal $B_{in}$ are (50,100,50). It is assumed that the Ye replacement signal W (that is, the yellow output signal $Ye_{out}$) is "80," and is replaceable by ($R_{out}$, $G_{out}$, $B_{out}$)=(80,80,0).

In the second example of the conventional technique, the red output signal $R_{out}$, the green output signal $G_{out}$ and the blue output signal $B_{out}$ are shown as follows.

$R_{out}$=50–50=0

$G_{out}$=100–80=20

$B_{out}$=50

In the second example of the conventional technique, the signal values (R,G,B) corresponding to respective color light components output from the projection type image display device 100 are (80,100,50). The hue (H) of the image light output from the projection type image display device 100 is calculated by using (Formula 48). Specifically, the hue (H) of the image light (80,100,80) is "84."

Here, the hue is considered as the circumference of the chromaticity diagram from the white point. (i.e.; the line indicating the wavelength in monochromatic color) The hue corresponding to the image input signal is a vector from the white point WP, via point $P_1$, to the circumference of the chromaticity diagram (proximity 520 nm).

The hue corresponding to the first example of the conventional technique is a vector from the white point WP, via point $P_4$, to the circumference of the chromaticity diagram (proximity 540 nm). The hue corresponding to the second example of the conventional technique is a vector from the white point WP, via point $P_5$, to the circumference of the chromaticity diagram (proximity 550 nm). The hue corresponding to the sixth embodiment is a vector from the white point WP, via point $P_6$, to the circumference of the chromaticity diagram (proximity 520 nm).

Figure 23:
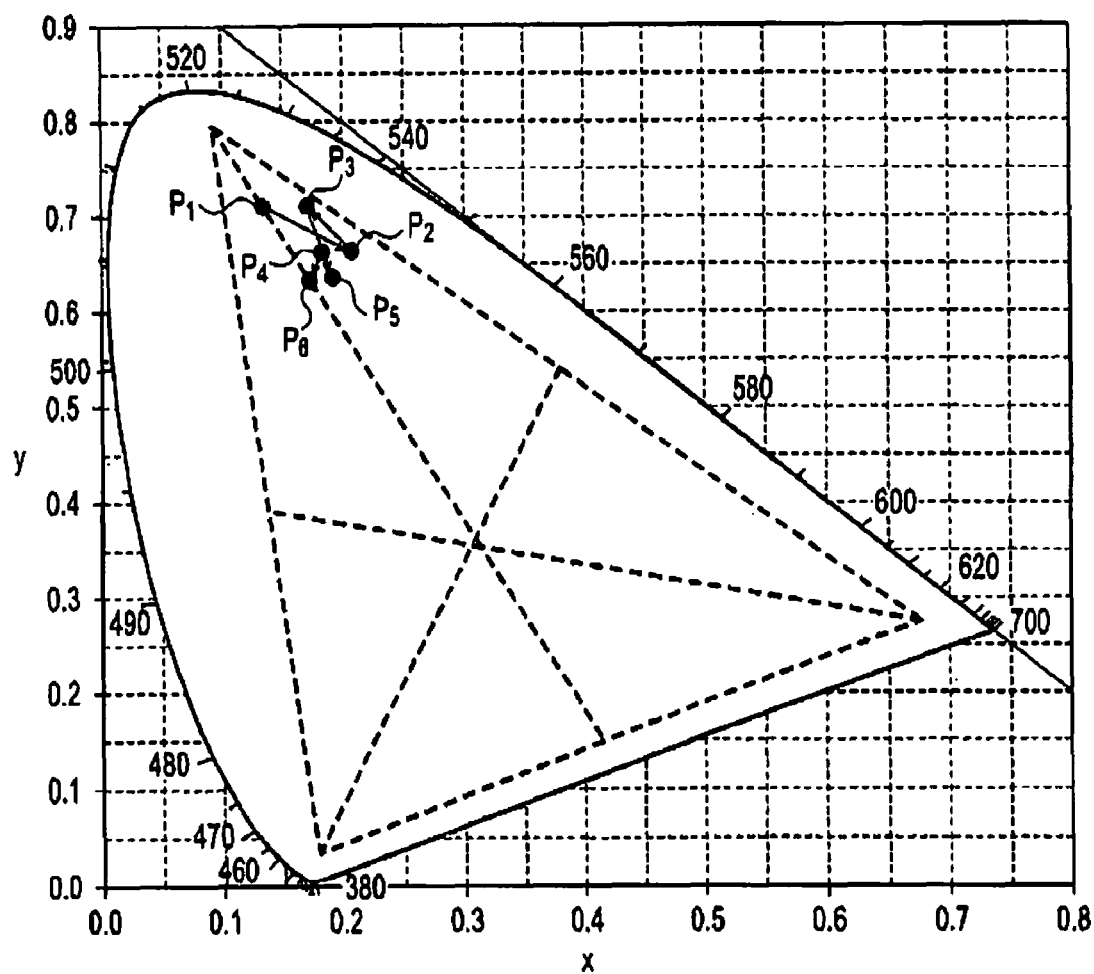
FIG. 23 is a diagram showing relationships of a first example of a conventional technique, a second example of the conventional technique and a sixth embodiment.

As it is clear from the aforementioned calculation results and FIG. 23, according to the sixth embodiment, the shifting of the hue of the video light output from the projection type video display device 100 from the hue of the input video signal is suppressed.

Other Embodiments

Although the present invention has been described in detail using the aforementioned embodiments, it should not be understood that any description or drawing constituting a part of this disclosure restricts this invention. From this disclosure, various alternative embodiments, examples and application techniques may become clear to those skilled in the art.

For example, the projection type image display device 100 may use a cyan light component Cy as the fourth color light component. In this case, among the red input signal $R_{in}$, the green input signal $G_{in}$ and the blue input signal $B_{in}$, the cyan output signal $Cy_{out}$ is generated on the basis of the green input signal $G_{in}$ and the blue input signal $B_{in}$, which correspond to colors (green color G and blue color B) different from the complementary color red color R) reproduced by the cyan light component Cy.

Likewise, the projection type image display device 100 may use a magenta light component M as the fourth color light component. In this case, among the red input signal $R_{in}$, the green input signal $G_{in}$ and the blue input signal $B_{in}$, the magenta output signal $M_{out}$ is generated on the basis of the red input signal $R_{in}$ and the blue input signal $B_{in}$, which correspond to colors (red color R and blue color B) different from the complementary color (green color G) reproduced by the magenta light component M.

Although the yellow output signal $Ye_{out}$ is generated by using the color reproduction parameter α and the luminance parameter $β_1$ in the cases of the aforementioned embodiments, the present invention is not limited to this. Specifically, the yellow output signal $Ye_{out}$ may be generated by using only the color reproduction parameter α or by using only the luminance parameter $β_1$. Moreover, the yellow output signal $Ye_{out}$ may be generated by using only the luminance parameters. Furthermore, the yellow output signal $Ye_{out}$ may be generated by using the color luminance parameter β1 and the luminance parameter $β_2$. It should be noted that the yellow output signal $Ye_{out}$ may be generated by appropriately combining the color reproduction parameter α, the luminance parameter β1 and the luminance parameter $β_2$.

Although each of the light components is a light emitted by a solid light source in the cases of the aforementioned embodiments, the present invention is not limited to this, Specifically, each of the light components may be a light separated from a light emitted from a white color light source such as a UHP lamp.

Although the controller 130 is provided in the projection type image display device 100 in the cases of the aforementioned embodiments, the present invention is not limited to this. Specifically, the controller 130 may be provided as a single unit.

Although the projection type image display device 100 is exemplified as an image display device in the cases of the aforementioned embodiments, the present invention is not limited to this. Any device that can display image may be used as the image display device.

Although the polarization switching element 230Ye is an element that selectively switches whether or not to rotate the polarization direction of the yellow light component in the case of the aforementioned fifth embodiment, the present invention is not limited to this. Specifically, any element that rotates the polarization direction of the yellow light component within a range of 0 to 90° may be used as the polarization switching element 230Ye.

What is claimed is:

1. An image signal processor comprising:
    a controller configured to generate a red output signal, a green output signal, a blue output signal and a fourth color output signal in accordance with image input signals including a red input signal corresponding to a red light component, a green input signal corresponding to a green light component and a blue input signal corresponding to a blue light component, and configured to output the red output signal, the green output signal, the blue output signal and the fourth color output signal,
    a red imager configured to modulate the red light component,
    a green imager configured to modulate the green light component,
    a blue imager configured to modulate the blue light component,
    a polarization switching element configured to adjust polarization state of a fourth color light component enables to reproduce a color outside the range of a color reproducible by the red light component, the green light component and the blue light component, and
    a combining unit configured to combine the light components emitted from the red imager, the green imager and the blue imager, wherein
    a superimposed light component, which is one of the red light component, the green light component, and the blue light component, enters the polarization switching element with the fourth color light component,
    the polarization switching element transmits the superimposed light component and the fourth color light component, while changing the polarization direction between the superimposed light component and the fourth color light component,
    the superimposed light component and the fourth color light component emitted from the polarization switching element enters an imager corresponding to the superimposed light component,
    the controller generates the fourth color output signal on the basis of a reference signal, among the image input signals, that corresponds to a color different from a complementary color of a color reproduced by the fourth color light component, and on the basis of a color reproduction parameter α for controlling a light amount of the fourth color light component, and
    the color reproduction parameter α is determined that the light amount of the fourth color light component is increased along with an increase in color saturation of an image.

2. The image signal processor according to claim 1, wherein
    the controller generates the fourth color output signal by using a luminance parameter $β_1$ for controlling a light amount of the fourth light component, and
    the luminance parameter $β_1$ is determined that the light amount of the fourth color light component is decreased along with an increase in color saturation of an image.

3. The image signal processor according to claim 1, wherein
    the controller generates the fourth color output signal by using a luminance parameter $β_2$ for controlling a light amount of the fourth color light component, and
    the luminance parameter $β_2$ is determined that the light amount of the four color light component is increased until the luminance of an image reaches a predetermined threshold value, and that the light amount of the fourth color light component is decreased after the luminance of the image exceeds the predetermined threshold value.

4. The image signal processor according to claim 1, wherein on the basis of a correlation between a target region that is to be controlled and an adjacent region adjacent to the target region, the controller generates the fourth color output signal corresponding to the target region.

5. The image signal processor according to claim 1, wherein on the basis of a correlation between a target region that is to be controlled and an adjacent region adjacent to the target region, the controller controls a subtraction amount of the reference signal corresponding to the target region.

6. The image signal processor according to claim 4, wherein the controller detects, on the basis of the image input signal, an edge that is a boundary of a high luminance region and a low luminance region,
    the controller increases the fourth color output signal corresponding to the target region when the target region is included in the high luminance region, and
    the controller decreases the fourth color output signal corresponding to the target region when the target region is included in the low luminance region.

7. The image signal processor according to claim 5, wherein the controller detects, on the basis of the image input signal, an edge that is a boundary of a high luminance region and a low luminance region,
    the controller decreases the subtraction amount of the reference signal corresponding to the target region when the target region is included in the high luminance region, and
    the controller increases the subtraction amount of the reference signal corresponding to the target region when the target region is included in the low luminance region.

8. The image signal processor according to claim 1, wherein
    the controller detects a background region and a foreground region on the basis of the image input signal, and the controller generates the fourth color output signal so that, among the foreground region and the background region, a light amount of the fourth color light component in a region where a motion vector is small is greater than the light amount of the fourth color light component in a region where the motion vector is large.

9. The image signal processor according to claim 1, wherein the controller calculates a subtraction amount of the reference signal in accordance with the fourth color output signal, and the controller calculates, in accordance with the difference between the fourth color output signal and the subtraction amount of the reference signal, an increase amount of a signal, among the image input signals, that corresponds to the complementary color of the color reproduced by the fourth color light component.

10. An image display device comprising: the controller according to any one of claims 2-9; and a image display unit configured to display image on the basis of the red output signal, the green output signal, the blue output signal and the fourth color output signal, which are outputted from the controller.

* * * * *